United States Patent
Kokojima et al.

(10) Patent No.: US 7,446,770 B2
(45) Date of Patent: Nov. 4, 2008

(54) APPARATUS OF AND METHOD FOR DRAWING GRAPHICS, AND COMPUTER PROGRAM PRODUCT

(75) Inventors: Yoshiyuki Kokojima, Kanagawa (JP); Takahiro Saito, Kanagawa (JP); Takashi Takemoto, Kanagawa (JP); Jiro Amemiya, Kanagawa (JP); Kenichi Mori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 294 days.

(21) Appl. No.: 10/981,681

(22) Filed: Nov. 5, 2004

(65) Prior Publication Data

US 2005/0134583 A1    Jun. 23, 2005

(30) Foreign Application Priority Data

Dec. 19, 2003   (JP)   ............................. 2003-423797

(51) Int. Cl.
   *G06T 11/20*   (2006.01)
   *G09G 5/00*    (2006.01)

(52) U.S. Cl. ...................... 345/441; 345/419; 345/622

(58) Field of Classification Search ................ 345/441, 345/622, 419
See application file for complete search history.

(56) References Cited

U.S. PATENT DOCUMENTS

| | | | |
|---|---|---|---|
| 5,757,321 A * | 5/1998 | Billyard | 345/426 |
| 6,072,505 A * | 6/2000 | Piazza et al. | 345/501 |
| 6,198,488 B1 | 3/2001 | Lindholm et al. | |
| 6,462,737 B2 | 10/2002 | Lindholm et al. | |
| 6,504,542 B1 * | 1/2003 | Voorhies et al. | 345/441 |
| 6,765,575 B1 * | 7/2004 | Voorhies et al. | 345/441 |
| 7,050,055 B2 * | 5/2006 | Lindholm et al. | 345/426 |
| 2002/0196251 A1 * | 12/2002 | Duluk et al. | 345/420 |
| 2005/0275663 A1 * | 12/2005 | Kokojima et al. | 345/622 |

OTHER PUBLICATIONS

Mark Olano, et al., "Triangle Scan Conversion using 2D Homogeneous Coordinates", 1997 SIGGRAPH/Eurographics Workshop, Aug. 3-4, 1997, pp. 89-95.

* cited by examiner

*Primary Examiner*—M Good Johnson
(74) *Attorney, Agent, or Firm*—Oblon, Spivak, McClelland, Maier & Neustadt, P.C.

(57) ABSTRACT

An apparatus of drawing graphics includes an edge coefficient calculator calculating, from vertex data on vertices of a triangle, edge coefficients of edge functions used to determine whether a pixel is present in an inside region of the triangle, and a bounding box calculator calculating a bounding box of projected images of the triangle on a projection plane based on the edge coefficients. The apparatus also includes a starting point determiner and a traverser. The starting point determiner classifies the projected images of the triangle based on a combination of the edge coefficients for respective sides of the triangle, and determines a scan starting point from a corner of the bounding box based on classification of the projected images. The traverser generates pixel data used in rasterization by scanning the bounding box from the scan starting point.

16 Claims, 49 Drawing Sheets

FIG.5

| x | y | z | w |
|---|---|---|---|
| X | Y | Z ||
| R | G | B | A |
| s | t | r | q |
| f | nx | ny | nz |

HOMOGENEOUS COORDINATES: x, y, z, w

DISPLAY COORDINATES: X, Y, Z

COLORS: R, G, B, A

TEXTURE COORDINATES: s, t, r, q

FOG: f

NORMAL VECTORS: nx, ny, nz (A)

a>0, b>0 a<0, b>0 a>0, b<0 a<0, b<0

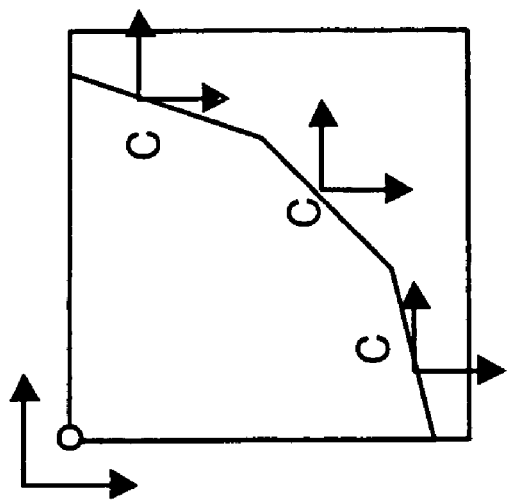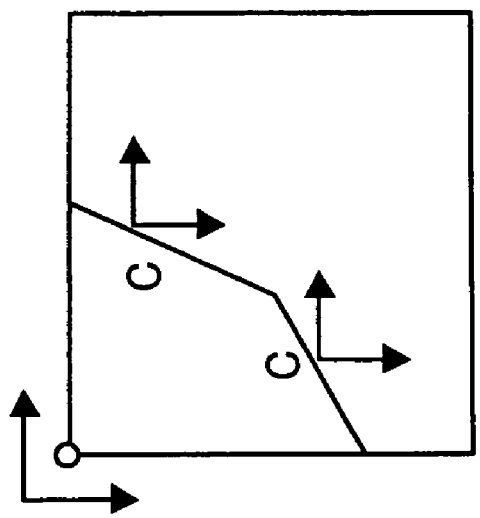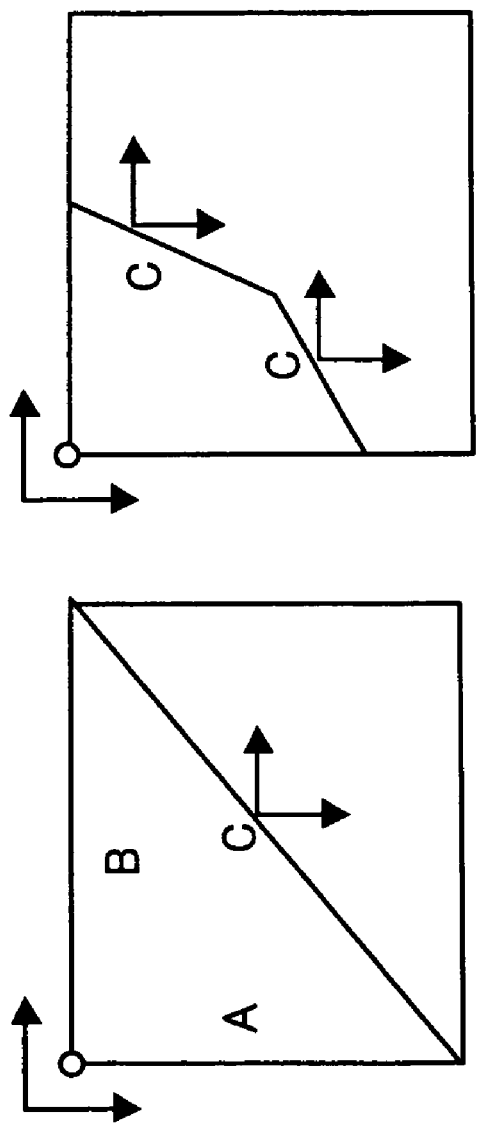

or=13
sum=13 or=14
sum=14

FIG.29

| a0 | b0 | c0 | — |
|----|----|----|----|
| a1 | b1 | c1 | — |
| a2 | b2 | c2 | — |
| Xmin | Ymin | Xmax | Ymax |
| Xs | Ys | — | — |
| sp0 | sp1 | sp2 | Es |

EDGE FUNCTIONS: a0, b0, c0, a1, b1, c1, a2, b2, c2

BOUNDING BOXES: Xmin, Ymin, Xmax, Ymax

STARTING POINTS: Xs, Ys

SENSE POINTS OF RESPECTIVE SIDES: sp0, sp1, sp3

INITIAL VALUE OF EDGE FUNCTION: Es

TILE BOUNDARY

TILE BOUNDARY

FIG.46

| X | Y |
|---|---|
| Z ||
| β0 | id0 |
| β1 | id1 |
| β2 | id2 |
| cov | — |

WINDOW COORDINATES: X, Y, Z

BARYCENTRIC COORDINATES: $\beta 1, \beta 2, \beta 3$

VERTEX INDICES: id1, id2, id3 coverage: cov

FIG.47

| X | Y | Z ||
|---|---|---|---|
| R | G | B | A |
| s | t | r | q |
| f | nx | ny | nz |
| cov | — | — | — |

WINDOW COORDINATES: X, Y, Z

COLORS: R, G, B, A

TEXTURE COORDINATES: s, t, r, q

FOG: f

NORMAL VECTORS: nx, ny, nz coverage: cov

FIG.49

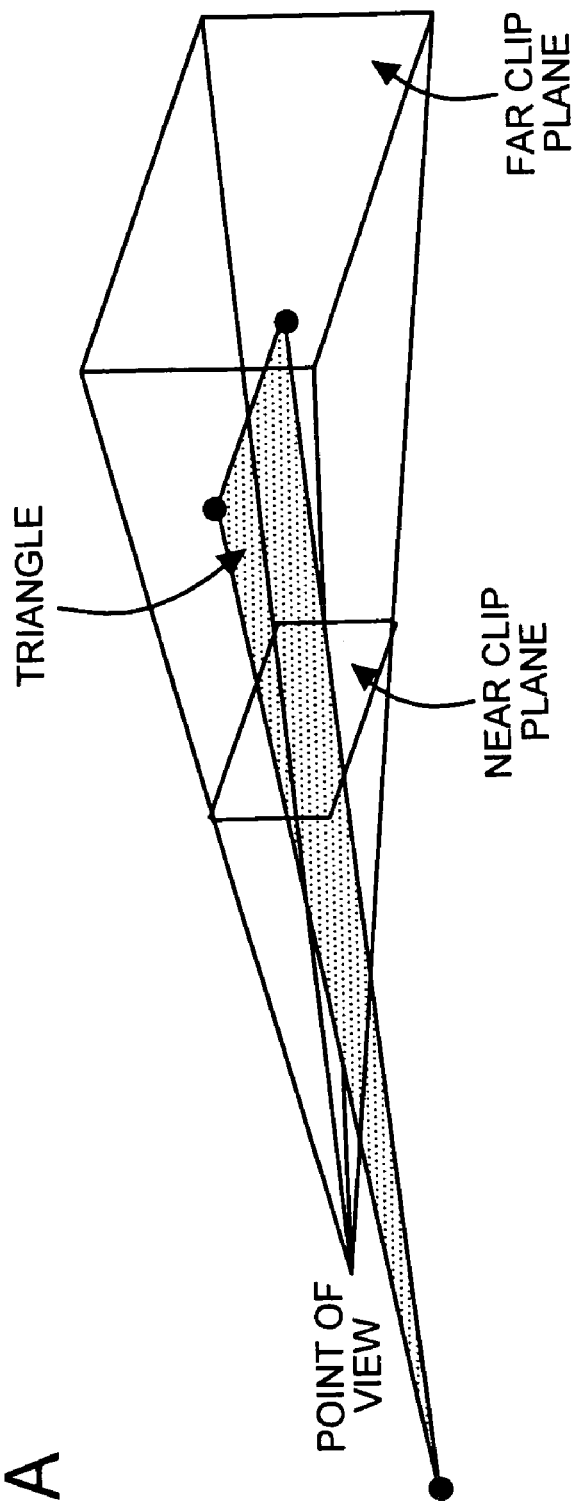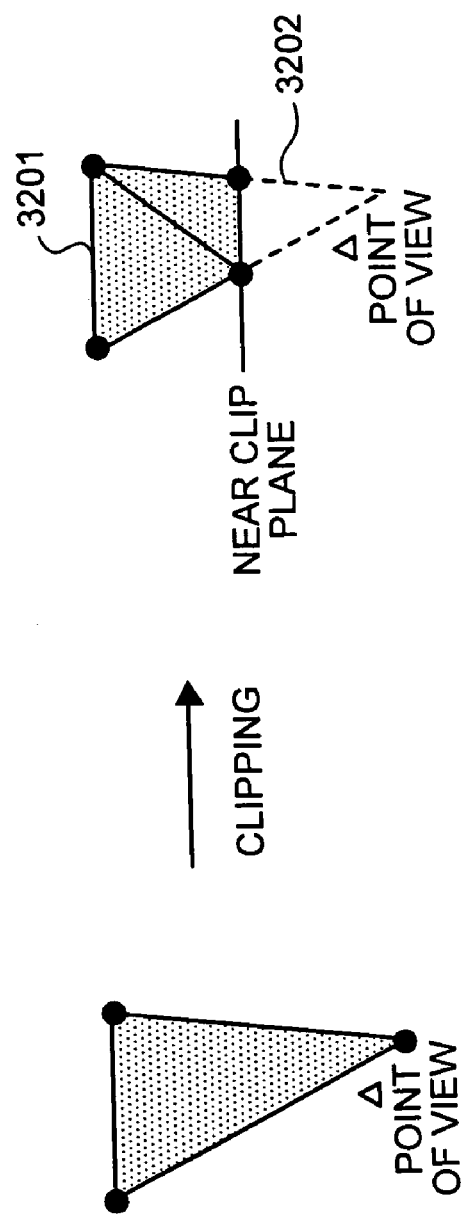
FIG.51A
FIG.51B

APPARATUS OF AND METHOD FOR DRAWING GRAPHICS, AND COMPUTER PROGRAM PRODUCT

CROSS-REFERENCE TO RELATED APPLICATIONS

This application is based upon and claims the benefit of priority from the prior Japanese Patent Application No. 2003-423797 filed on Dec. 19, 2003 the entire contents of which are incorporated herein by reference.

BACKGROUND OF THE INVENTION

1) Field of the Invention

The present invention relates to an apparatus of and a method for drawing three-dimensional graphics, and more specifically, to rasterization of triangles.

2) Description of the Related Art

A conventional computer graphics drawing apparatus has the following configuration. FIG. 48 is a block diagram of the configuration of a conventional real-time computer graphics (CG) drawing apparatus. The conventional drawing processing apparatus mainly includes a vertex input processor 2901 that inputs vertex data on a triangle, a vertex operational processor 2902 that operates the vertex data input from the vertex input processor 2901, a rasterizer 2903 that generates pixel data from the vertex data processed by the vertex operational processor 2902, a pixel processor 2907 that operates the pixel data generated by the rasterizer 2903, a vertex buffer 2906 that buffers the vertex data input from the vertex operational processor 2902, and a drawing memory 2908 that stores the pixel data processed by the pixel processor 2907.

The rasterizer 2903 includes a setup processor 2904 that acquires data on three vertices of the triangle from the vertex data buffer 2906, and that generates setup data necessary for rasterization, and a traverser 2905 that generates the pixel data using the setup data received from the setup processor 2904.

The vertex data input to the rasterizer 2903 is organized by vertex coordinates such as homogeneous coordinates and window coordinates, and vertex parameters such as colors, a fog, texture coordinates, and normal vectors. Using the vertex data, the rasterizer 2903 carries out a processing for detecting pixels inside of the triangle, and a processing for calculating pixel parameters, and generates the pixel data. The pixel data is organized by widow coordinates, a depth, a color, a fog, texture coordinates, normal vectors, and a flag representing whether a pixel is inside of the triangle.

Normally, the rasterizer 2903 expresses a shape of the triangle by linear equations for three sides as the following equations (1):

$$A0(X, Y) = a0 \cdot (X-X0) + b0 \cdot (Y-Y0)$$

$$A1(X, Y) = a1 \cdot (X-X1) + b1 \cdot (Y-Y1)$$

$$A2(X, Y) = a2 \cdot (X-X2) + b2 \cdot (Y-Y2) \tag{1}$$

where X and Y denote the window coordinates, (X0, Y0), (X1, Y1), (X2, Y2) denote the window coordinates of vertices of the triangle, respectively, and a0, a1, a2, b0, b1, and b2 denote constants. These linear equations are called edge functions, which are used to classify the pixels on a display into three regions of the triangle, inside, on sides, and outside.

Namely, if values of the edge functions are greater than zero, a pixel is inside the triangle. If the values of the edge are just zero, the pixel is on a side of the triangle. If the values of the edge functions are smaller than zero, the pixel is outside the triangle. The rasterizer 2903 determines whether values of the edge functions of the three sides are all greater than zero, thereby determining whether the pixel is inside the triangle. Gradients a0, b0, a1, b1, a2, and b3 of the edge functions are calculated by the following equations (2):

$$a0 = Y0 - Y1$$

$$b0 = X1 - X0$$

$$a1 = Y1 - Y2$$

$$b1 = X2 - X1$$

$$a2 = Y2 - Y0$$

$$b2 = X0 - Y2 \tag{2}$$

As a method for incorporating these calculation procedures in hardware, a method using a digital differential analyzer (DDA) and a method based on direct evaluation (DE) are known.

With the DDA method, only initial values of the edge functions of a typical pixel are calculated by equation (1), and the gradients of the edge functions are sequentially added to the respective initial values, thereby calculating edge functions of adjacent pixels.

Since the DDA method is required to perform only addition except for the calculation of the initial values, a circuit area of the drawing processing apparatus can be reduced. With the DDA method, however, it is necessary to consider errors resulting from accumulation of addition. In the rasterizer 2903, the setup processor 2904 calculates the initial values and the gradients, and the traverser 2905 adds the gradients to the respective initial values.

With the DE method, the edge functions of all pixels are calculated by equation (1). Therefore, if the DE method is used, it is unnecessary to consider errors, differently from the DDA method. However, because of the frequent use of multiplication, the circuit area of the processing apparatus is increased. In the rasterizer 2903, the setup processor 2905 calculates the gradients, and the traverser 2905 performs multiplication using equation (1).

The rasterizer 2903 calculates the parameters, such as the depth, the color, the fog, the texture coordinates, and the normal vectors, for each of the pixels determined to be inside the triangle. These parameters are calculated by interpolating the parameters for the three vertices of the triangles. As an interpolation calculation method, two methods are known: a method using the DDA and a method using barycentric coordinates $\beta$.

With the DDA method, initial values of the parameters for the typical pixel (X, Y) are calculated by the following equation (3):

$$P(X, Y) = a \cdot X + b \cdot Y + c \tag{3}$$

By sequentially adding the gradients a and b to the respective initial values, parameters for adjacent pixels are calculated. The coefficients a, b, and c in equation (3) are calculated by the following equations (4):

$$a \cdot X0 + b \cdot Y0 + c = p0$$

$$a \cdot X1 + b \cdot Y1 + c = p1$$

$$a \cdot X2 + b \cdot Y2 + c = p2 \tag{4}$$

where (X0, Y0), (X1, Y1), and (X2, Y2) are window coordinates of the three vertices of the triangles, and p0, p1, and p2 are corresponding vertex parameters. Similarly to the edge functions, the DDA method is required to perform only addition except for the calculation of the initial values. Therefore, an operational circuit can be made small in size. It is, however, necessary to consider errors resulting from accumulation of the addition. Further, the coefficients a, b, and c need to be calculated by equation (4) by as much as the number of parameters. If the number of parameters is large, a calculation volume is disadvantageously increased. In the rasterizer 2903, the setup processor 2905 calculates the initial values and the gradients, and the traverser 2905 adds the gradients to the respective initial values.

With the method using the barycentric coordinates β, all the parameters can be interpolated using the following equation (5):

$$P(X, Y) = s0 \cdot p0 + s1 \cdot p1 + s2 \cdot p2 \qquad (5)$$

With this method, even if the parameters are changed, the parameters can be interpolated using the barycentric coordinates β0, β2, and β2. Therefore, the method using the barycentric coordinates β is effective if the number of parameters is large. The barycentric coordinates β0, β1, and β2 are calculated by the following equations (6):

$$\beta 0(X, Y) = (1/\text{sum}(X, Y)) \cdot A0(X, Y)$$

$$\beta 1(X, Y) = (1/\text{sum}(X, Y)) \cdot A1(X, Y)$$

$$\beta 2(X, Y) = (1/\text{sum}(X, Y)) \cdot A2(X, Y)$$

$$1/\text{sum}(X, Y) = 1/(A\,0(X, Y) + A1(X, Y) + A2(X, Y)) \qquad (6)$$

In the rasterizer 2903, the traverser 2905 performs calculations of equation (6) and calculates the barycentric coordinates of the respective pixels. Either the traverser 2905 or the pixel processor 2907 connected in rear of the rasterizer 2903 perform calculations of equation (5).

Using one of these methods, the rasterizer 2903 carries out the processing for determining whether each pixel is inside the triangle, and the processing for interpolating the vertex parameters and calculating the parameters for the respective pixels.

As can be seen, according to the conventional art, the processing for determining whether each pixel is inside the triangle and the processing for interpolating the vertex parameters and calculating the pixel parameters are carried out. These processings are carried out using the window coordinates of the vertices of a drawing primitive. To do so, the vertex operational processor 2902 projects the vertices on a window, and transmits the window coordinates on which the vertices are projected on the window to the rasterizer 2903.

However, the vertex data on the triangle input to the rasterizer 2903 often include data on the vertex for which a W component of view coordinates is smaller than zero, that is, data indicating that a part of the triangle is behind a point of view. If the triangle includes the vertex located behind the point of view, the vertex is not projected onto the window and does not, therefore, include window coordinates. Considering this, if such a triangle is to be rasterized, as shown in FIG. 32, the triangle is cut on a near clip plane into a part 3201 which is projected onto a view port and a part 3202 which is not projected onto the view port in advance. The rasterizer 2903 inputs window coordinates of the part 3201 projected onto the window. The processing for dividing the drawing primitive on the clip plane is referred to as "clipping". Since the clipping is complicated and large in processing amount, it is normally carried out using dedicated hardware. However, U.S. Pat. No. 6,504,542 discloses a rasterization processing technique which can dispense with the clipping.

Nevertheless, in order to adopt the conventional rasterization processing, a new processing for efficiently searching for a scan starting point is necessary. For this reason, if a part of the triangle is behind the point of view, the drawing processing apparatus is required to carry out a special processing such as the processing for searching for the scan starting point besides the processings carried out if all regions of the triangle are projected onto the window, i.e., a projection plane. Processing efficiency is thereby disadvantageously deteriorated.

SUMMARY OF THE INVENTION

It is an object of the present invention to at least solve the problems in the conventional technology.

An apparatus of drawing graphics according to one aspect of the present invention includes an edge coefficient calculator calculating, from vertex data on vertices of a triangle, edge coefficients of edge functions used to determine whether a pixel is present in an inside region of the triangle, and a bounding box calculator calculating a bounding box of projected images of the triangle on a projection point based on the edge coefficients. The apparatus also includes a starting point determiner and a traverser. The starting point determiner classifies the projected images of the triangle based on a combination of the edge coefficients for respective sides of the triangle, and determines a scan starting point from a corner of the bounding box based on classification of the projected images. The traverser generates pixel data used in rasterization by scanning the bounding box from the scan starting point.

A method for drawing graphics according to one aspect of the present invention includes calculating, from vertex data on vertices of a triangle, edge coefficients of edge functions used to determine whether a pixel is present in an inside region of the triangle; and calculating a bounding box of projected images of the triangle on a projection plane based on the edge coefficients. The method also includes classifying the projected images of the triangle based on a combination of the edge coefficients for respective sides of the triangle; determining a scan starting point from a corner of the bounding box based on classification of the projected images; and generating pixel data used in rasterization by scanning the bounding box from the scan starting point.

The computer program product according to still another aspect of the present invention causes a computer to perform the method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a data structure diagram of one example of vertex data;

FIGS. 19A to 19C depict the projected images of the triangle at "or=8";

FIG. 29 is a data structure diagram of an example of setup data;

FIG. 46 is a data structure diagram of an example of the pixel data;

FIG. 47 is a data structure diagram of an example of the pixel data after parameter data synthesis;

FIG. 49 is an explanatory view for area rasterization;

FIGS. 51A and 51B are schematic views of an outline of a clipping processing for the triangle.

DETAILED DESCRIPTION

Exemplary embodiments of a drawing processing apparatus, a drawing processing method, and a drawing processing program are explained below with reference to the accompanying drawings.

Figure 1:
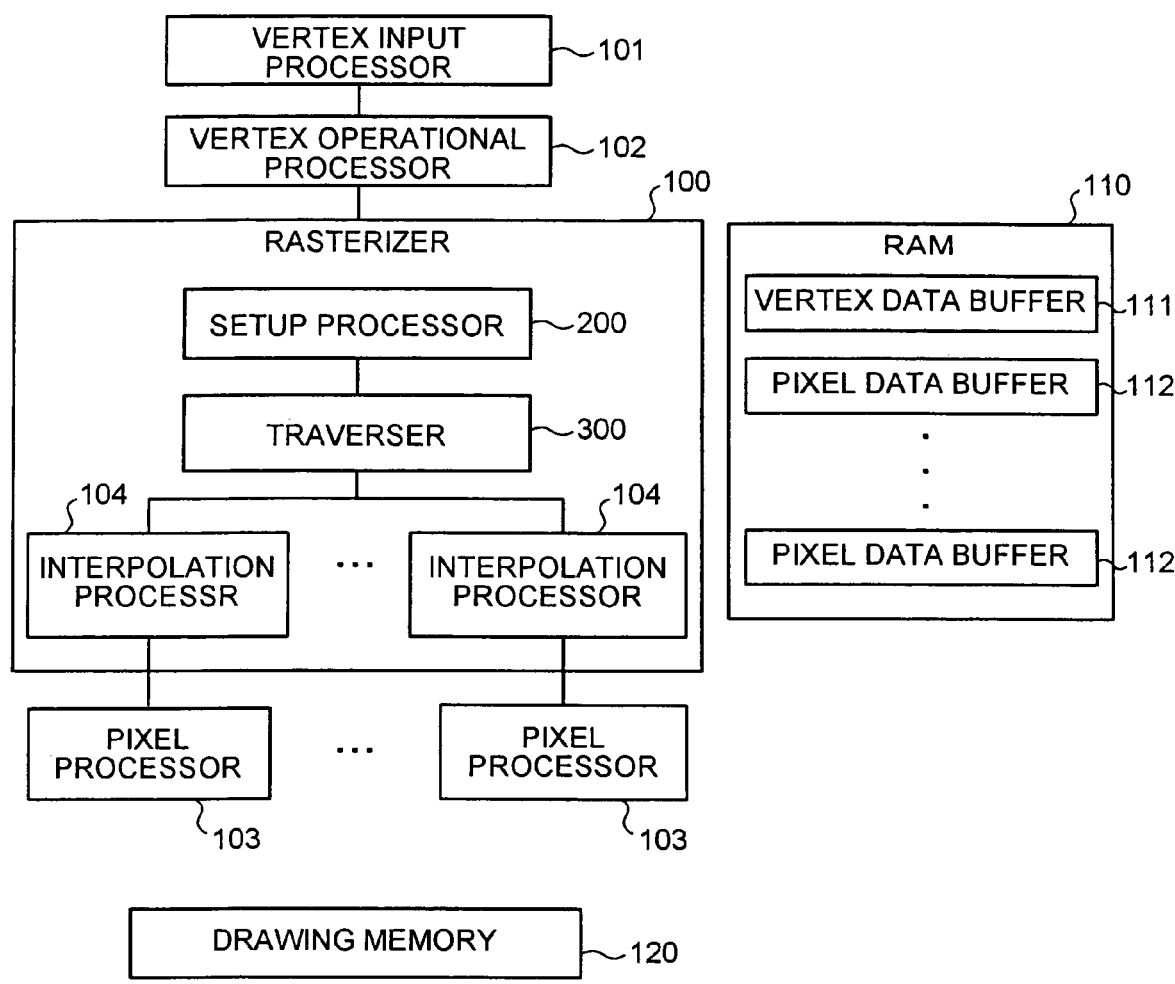
FIG. 1 is a block diagram of the configuration of a drawing processing apparatus according to an embodiment of the present invention.
Figure 48:
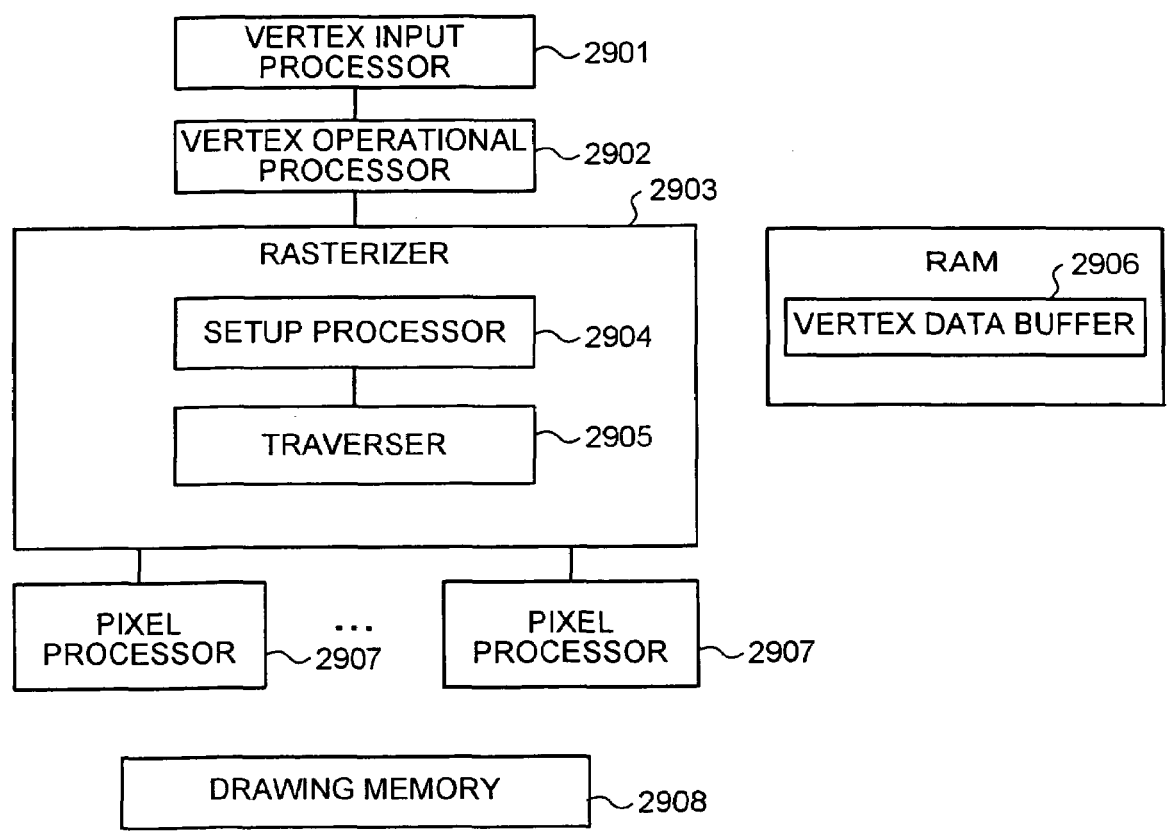
FIG. 48 is a block diagram of the configuration of an ordinary, conventional drawing processing apparatus.

FIG. 1 is a block diagram of a drawing processing apparatus according to one embodiment of the present invention. As shown in FIG. 1, the drawing processing apparatus includes a vertex input processor 101, a vertex operational processor 102, a rasterizer 100, a plurality of pixel processors 103, a drawing memory 120, and a vertex data buffer 111 and a plurality of pixel data buffers 112 that are secured in a random access memory (RAM) 110. This drawing processing apparatus differs from the conventional apparatus shown in FIG. 48 in that the rasterizer 100 also includes an interpolation processor 104, and in that the RAM also includes the pixel data buffer 112.

The vertex input processor 101 inputs vertex data on a triangle to be drawn. The vertex data is organized by vertex coordinates such as homogeneous coordinates and window coordinates, colors, a fog, texture coordinates, and normal vectors.

The vertex operational processor 102 operates the vertex data input from the vertex input processor 101.

The rasterizer 100 generates pixel data from the vertex data processed by the vertex operational processor 102.

The pixel processor 103 operates the pixel data generated by the rasterizer 100. In this embodiment, a plurality of pixel processors 103 are provided so as to perform parallel pixel processings. For this reason, a display is divided into rectangular regions called "areas", and the pixel processors 103 are individually allocated to the respective divided areas.

The pixel data is organized by the window coordinates, a depth, the color, the fog, the texture coordinates, the normal vectors, a flag indicating whether each pixel is in an inside region of the triangle.

As shown in FIG. 1, the rasterizer 100 includes a setup processor 200, a traverser 300, and a plurality of interpolation processors 104.

The setup processor 200 acquires data on three vertices of the triangle from the vertex data buffer 111, generates setup data necessary for rasterization.

The traverser 300 generates the pixel data using the setup data received from the setup processor 200.

The interpolation processors 104 interpolate parameters for the three vertices of the triangle stored in the vertex data buffer 111, and calculate parameters for pixels stored in the pixel data buffer 112.

It is necessary to scan target pixels as efficiently as possible so that the rasterizer 100 can efficiently carry out processings. In this embodiment, a scan is performed for each rectangular region unit referred to as "stamp" so as to efficiently scan the scan target pixels. The stamp is a set of pixels to be processed in parallel in one cycle by the rasterizer 100.

If a size of the stamp is, for example, 2×4 pixels, the rasterizer 100 processes eight pixels in one cycle. The traverser 300 in the rasterizer 100 moves one stamp to another every cycle, scans the stamp on a display, and generates the pixel data. At this moment the traverser 300 determines whether points around the stamp are in the inside region of the triangle, and determines a moving direction based on a determination result. The traverser 300 thereby scans the pixels inside the triangle efficiently. The points around the stamp, which are points at precedent positions relative to the moving direction, are referred to as "sense points".

The vertex data buffer 111 stores the vertex data input from the vertex operational processor 102. The pixel data buffer 112 stores the pixel data generated by the traverser 300.

The drawing memory 120 stores the pixel data processed by the pixel processor 103. As this drawing memory 120, the RAM 110 may be used in place of the drawing dedicated memory in this embodiment.

Figure 2:
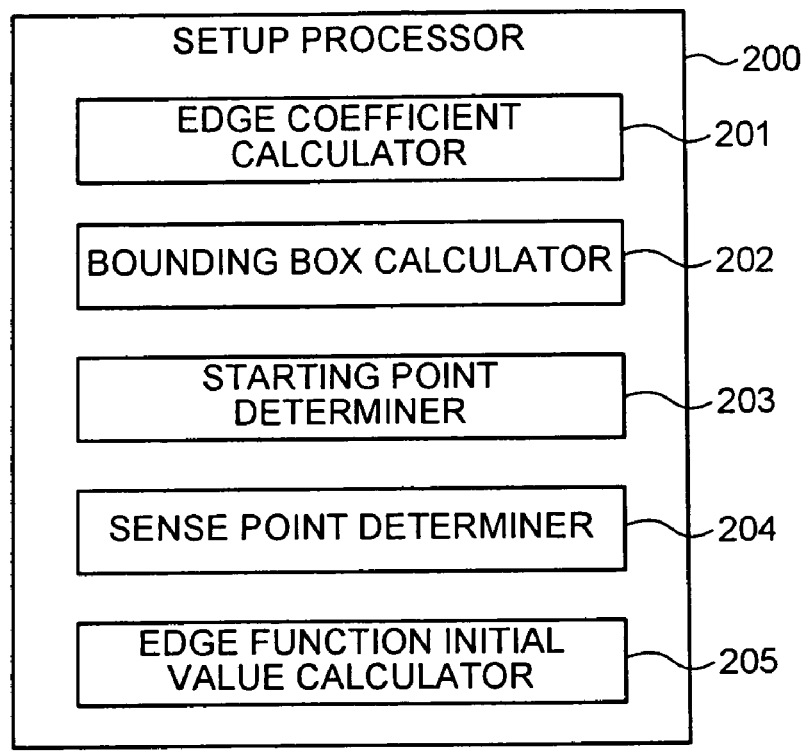
FIG. 2 is a block diagram of the configuration of a setup processor.

FIG. 2 is a block diagram of the functional configuration of the setup processor 200. As shown in FIG. 2, the setup processor 200 includes an edge coefficient calculator 201, a bounding box calculator 202, a starting point determiner 203, a sense point determiner 204, and an edge function initial value calculator 205.

The edge coefficient calculator 201 calculates coefficients (gradients) of edge functions. The bounding box calculator 202 calculates a bounding box of projected images of the triangle. The starting point determiner 203 determines a scan starting point from four corners of the bounding box calculated by the bounding box calculator 202. The edge function initial value calculator 205 calculates values of the edge functions for a typical pixel as DDA initial values.

Figure 3:
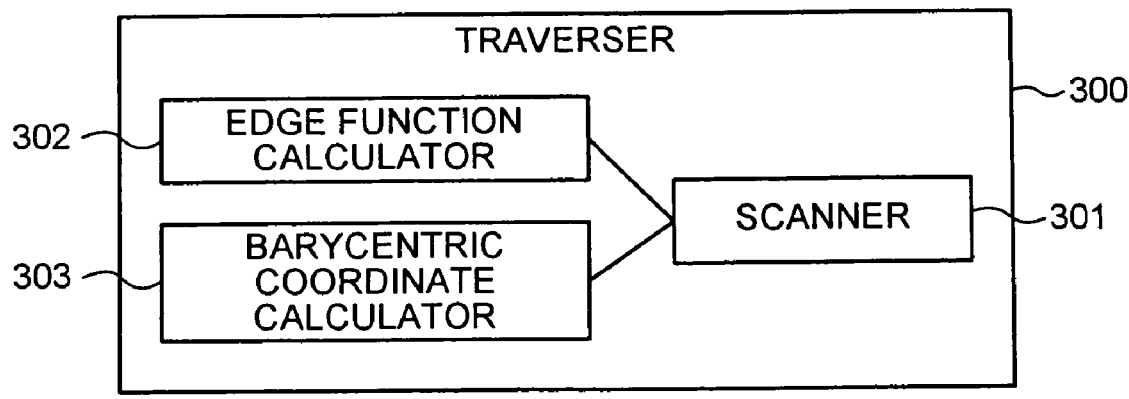
FIG. 3 is a block diagram of the configuration of a traverser.

FIG. 3 is a block diagram of the functional configuration of the traverser 300. As shown in FIG. 3, the traverser 300 includes a scan unit 301, an edge function calculator 302, and a barycentric coordinate calculator 303.

The scan unit 301 follows adjacent stamps or areas from the stamp or area including the scan starting point determined by the starting point determiner 203, and thereby scans the pixels. The edge function calculator 302 calculates the values of the edge functions for the pixels included in the stamp. The barycentric coordinate calculator 303 calculates barycentric coordinates of the pixels included in the stamp.

The drawing processing apparatus according to this embodiment includes a controller such as a central processor (CPU), storage devices such as a read only memory (ROM) and a RAM, a hard disk, a hard disk drive (HDD), an external storage device such as a compact disk (CD) drive, a display device such as a display, and input devices such as a keyboard and a mouse (none of which are shown in the drawings). The drawing processing apparatus has a hardware configuration using a dedicated game machine or a computer.

A drawing processing program by the drawing processing apparatus according to this embodiment is provided by being recorded in a computer readable recording medium such as a CD-ROM, a flexible disk (FD), a CD-R, or a digital versatile disk (DVD) as a file in an installable format or an executable format.

The drawing processing program executed by the drawing processing apparatus according to this embodiment may be stored in a computer connected to a network such as the Internet, and provided by being downloaded via the network. Further, the drawing processing program executed by the drawing processing apparatus according to this embodiment may be provided or distributed via the network such as the Internet.

The drawing processing program executed by the drawing processing apparatus according to this embodiment is read from the recording medium and executed, whereby the program is loaded to a main storage device, and the respective constituent units (such as the rasterizer 100 and the pixel processor 103) are generated in the main storage device.

A triangle drawing processing method executed by the drawing processing apparatus according to this embodiment thus constituted will next be explained.

Figure 4:
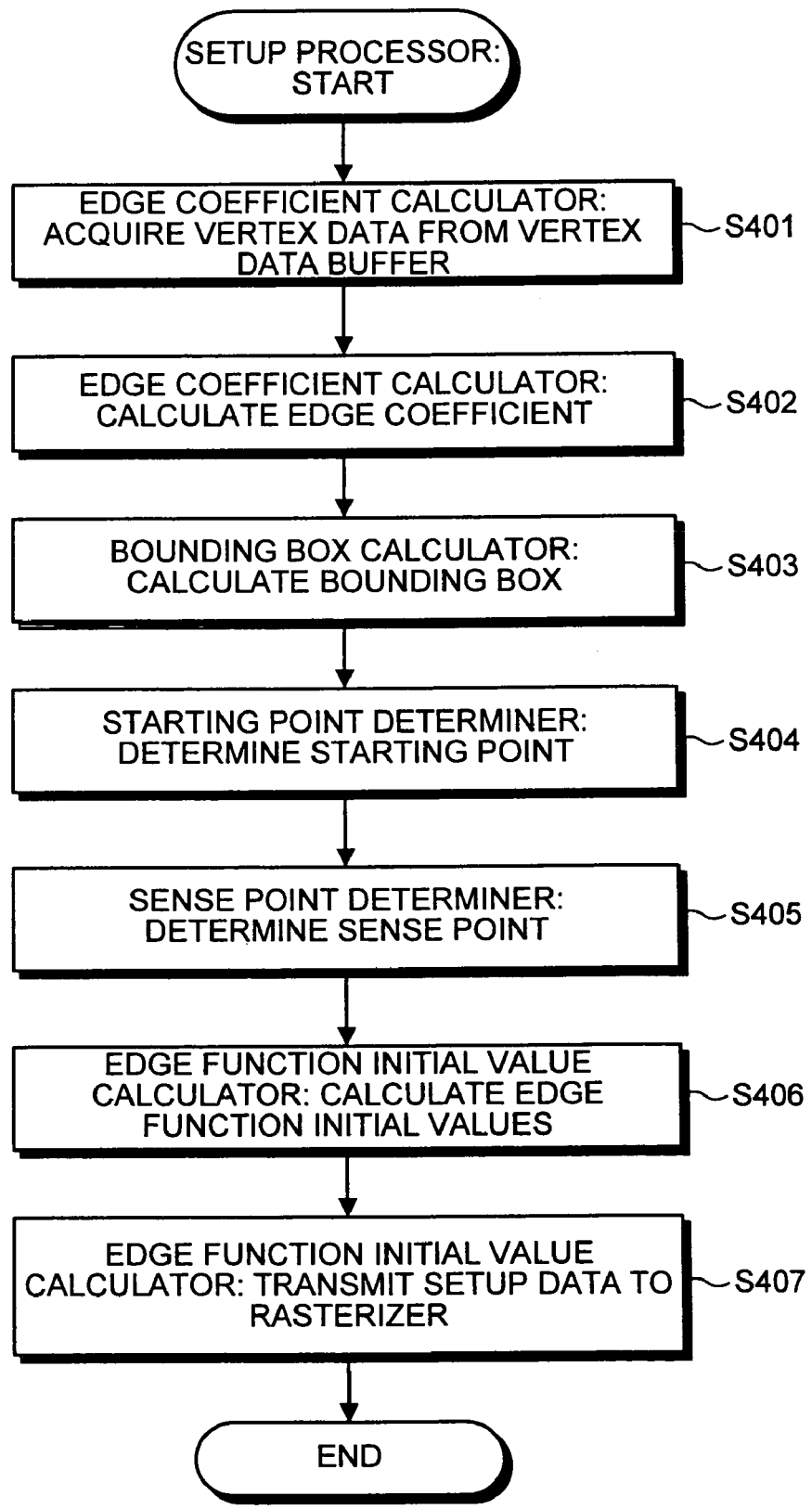
FIG. 4 is a flowchart of the processing procedures of the setup processor.

Processings of the setup processor 200 will be explained. FIG. 4 is a flowchart of the procedures for a setup data generation processing performed by the setup processor 200.

In the setup processor 200, the edge coefficient calculator 202 acquires vertex data on the three vertices of the triangle from the vertex data buffer 111 (at step S401). FIG. 5 is a data structure diagram of one example of the vertex data. In the example shown in FIG. 5, the vertex data is organized by the homogeneous coordinates, the window coordinates, the colors, the texture coordinates, the fog, and the normal vectors. The vertex data is not limited to the data structure shown in FIG. 5 but may be constituted to have another data structure.

If W components of the homogeneous coordinates of the three vertices thus acquired are all smaller than zero, the triangle is completely behind the point of view. If so, the apparatus may be constituted to acquire vertex data on vertices of a next triangle without executing later processings.

The edge coefficient calculator 201 calculates the coefficients of the edge functions (at step S402). The edge functions in this embodiment are expressed by the following equations (7):

$$V0(x, y, w) = a0 \cdot x + b0 \cdot y + c0 \cdot w$$

$$V1(x, y, w) = a1 \cdot x + b1 \cdot y + c1 \cdot w$$

$$V2(x, y, w) = a2 \cdot x + b2 \cdot y + c2 \cdot w \quad (7)$$

where (x, y, w) denotes homogeneous coordinates of a vertex of the triangle. Edge coefficients a0, b0, c0, a1, b1, c1, a2, b2, and c2 are calculated by the following equations (8) to (10):

$$a0 \cdot x0 \cdot b0 \cdot y0 + c0 \cdot w0 = 1$$

$$a0 \cdot x1 \cdot b0 \cdot y1 + c0 \cdot w1 = 0$$

$$a0 \cdot x2 \cdot b0 \cdot y2 + c0 \cdot w2 = 0 \quad (8)$$

$$a1 \cdot x0 \cdot b1 \cdot y0 + c1 \cdot w0 = 0$$

$$a1 \cdot x1 \cdot b1 \cdot y1 + c1 \cdot w1 = 1$$

$$a1 \cdot x2 \cdot b1 \cdot y2 + c1 \cdot w2 = 0 \quad (9)$$

$$a2 \cdot x0 \cdot b2 \cdot y0 + c2 \cdot w0 = 0$$

$$a2 \cdot x1 \cdot b2 \cdot y1 + c2 \cdot w1 = 0$$

$$a2 \cdot x2 \cdot b2 \cdot y2 + c2 \cdot w2 = 1 \quad (10)$$

Equations (8) to (10) are, if rewritten using matrixes, expressed by the following equation (11):

$$M \cdot V = I \quad (11)$$

where matrixes M, V, and I are expressed by the following equations (12) to (14), respectively:

$$M = \begin{bmatrix} a0 & b0 & c0 \\ a1 & b1 & c1 \\ a2 & b2 & c2 \end{bmatrix} \quad (12)$$

$$V = \begin{bmatrix} x0 & x1 & x2 \\ y0 & y1 & y2 \\ z0 & z1 & z2 \end{bmatrix} \quad (13)$$

$$I = \begin{bmatrix} 1 & 0 & 0 \\ 0 & 1 & 0 \\ 0 & 0 & 1 \end{bmatrix} \quad (14)$$

Equation (11) indicates that the matrix M of the edge functions is an inverse matrix $V^{-1}$ of the matrix V. Accordingly, respective matrix elements of the matrix M can be calculated based on the following equations (15):

$$a0 = (y1 \cdot w2 - y2 \cdot w1)/\det$$

$$b0 = (w1 \cdot x2 - w2 \cdot x1)/\det$$

$$c0 = (x1 \cdot y2 - x2 \cdot y1)/\det$$

$$a1 = (y2 \cdot w0 - y0 \cdot w2)/\det$$

$$b1 = (w2 \cdot x0 - w0 \cdot x2)/\det$$

$$c1 = (x2 \cdot y0 - x0 \cdot y2)/\det$$

$$a2 = (y0 \cdot w1 - y1 \cdot w0)/\det$$

$$b2 = (w0 \cdot x1 - w1 \cdot x0)/\det$$

$$c2 = (x0 \cdot y1 - x1 \cdot y0)/\det$$

$$\det = x0 \cdot (y1 \cdot w2 - y2 \cdot w1) - x1 \cdot (y0 \cdot w2 - y2 \cdot w0 + x2 \cdot (y0 \cdot w1 - y1 \cdot w0) \quad (15)$$

It is noted, however, only a ratio matters in the homogeneous coordinate. Division using 'det' in the following equations (16) can be, therefore, omitted. The edge coefficients a0, b0, c0, a1, b1, c1, a2, b2, and c2 can be calculated using equations (16):

$$a0 = y1 \cdot w2 - y2 \cdot w1$$

$$b0 = w1 \cdot x2 - w2 \cdot x1$$

$$c0 = x1 \cdot y2 - x2 \cdot y1$$

$$a1 = y2 \cdot w0 - y0 \cdot w2$$

$$b1 = w2 \cdot x0 - w0 \cdot x2$$

$$c1 = x2 \cdot y0 - x0 \cdot y2$$

$$a2 = y0 \cdot w1 - y1 \cdot w0$$

$$b2 = w0 \cdot x1 - w1 \cdot x0$$

$$c2 = x0 \cdot y1 - x1 \cdot y0 \quad (16)$$

If these calculation procedures are put together, the edge coefficient calculator 201 calculates the edge coefficients by calculating equation (16) (at step S402). However, if a triangle degenerate determination and a triangle front-and-rear side determination are executed, it is necessary to perform separate calculations.

The bounding box calculator 202 calculates the bounding box (at step S403). The "bounding box" means a common area to a circumscribed rectangle of the projected image of the triangle and a scissor box. Generally, the scissor box is input as a parameter for the drawing processing apparatus. The processing of the bounding box calculator 202 at step S403 is, therefore, mainly to calculate the circumscribed rectangle of the projected image of the triangle.

After finishing the calculation of the bounding box, the starting point determiner 203 determines a scan starting point (at step S404). After the starting point is determined, the sense point determiner 204 determines a sense point used for an inside and outside determination of each side of the triangle (at step S405). After the sense point is determined, the edge function initial value calculator 205 calculates values of the edge functions for the typical pixel as DDA initial values (at step S406). To calculate the values of the edge functions for the typical pixel (X, Y), the following equation (17) obtained by dividing the both sides of equation (17) by w0, w1, and w2, respectively is used:

$$V0(X, Y) = V0(x, y, w)/w0 = a0 \cdot X + b0 \cdot Y + c0$$

$$V1(X, Y) = V1(x, y, w)/w1 = a1 \cdot X + b1 \cdot Y + c1$$

$$V2(X, Y) = V2(x, y, w)/w2 = a2 \cdot X + b2 \cdot Y + c2 \quad (17)$$

The traverser 300 connected in rear of the setup processor 200 sequentially adds gradients to the respective initial values calculated at step S406, thereby obtaining the values of the edge functions for the pixels other than the typical pixel. The setup data generated by the setup processor 200 is transmitted to the traverser 300 (at step S407). FIG. 29 is an explanatory view of the data structure of the setup data. As shown In FIG. 29, the setup data is organized by the edge functions, the bounding boxes, the starting points, the sense points of the respective sides, and the initial values of the edge functions.

Figure 6:
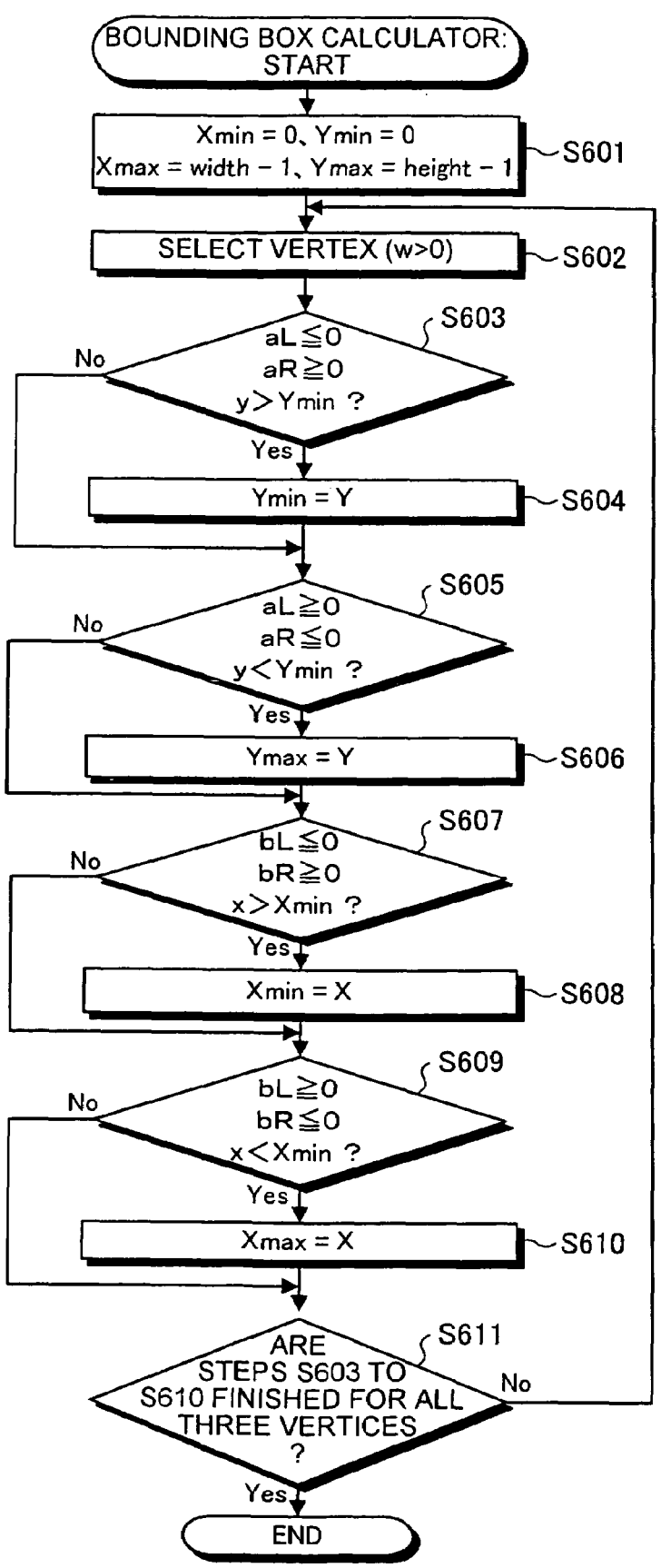
FIG. 6 is a flowchart of the processing procedures for obtaining a circumscribed rectangle of projected images of a triangle by a bounding box calculator.

A bounding box calculation processing executed by the bounding box calculator 202 at step S403 will be explained. FIG. 6 is a flowchart of the procedures for the bounding box calculation processing.

Normally, the circumscribed rectangle of the projected image of the triangle can be easily obtained by calculating maximums and minimums of XY components in the window coordinates of the vertices. However, if the triangle includes the vertex for which the W component of the homogenous coordinates is smaller than zero, the vertex cannot be projected onto the projection plane. In this embodiment, therefore, the circumscribed rectangle is obtained as follows.

The bounding box calculator 202 first initializes the circumscribed rectangle. The circumscribed rectangle is represented by window coordinates ($X_{min}$, $Y_{min}$) in an upper left corner and window coordinates ($X_{max}$, $Y_{max}$) in a lower right corner. In this embodiment, the bounding box calculator 202 initializes the window coordinates ($X_{min}$, $Y_{min}$) to (0, 0) and the window coordinates ($X_{max}$, $Y_{max}$) to (width−1, height−1) (at step S601). "Width" and "height" denote view ports.

The bounding box calculator 202 selects one vertex for which the W component of the coordinates is greater than zero from the three vertices of the triangle (at step S602). At steps S603 to S606, an X-direction gradient of the side extending leftward from the selected vertex is indicated by aL, and that of the side extending rightward is indicated by aR. At steps S607 to S609, a Y-direction gradient of the side extending leftward from the selected vertex is indicated by bL, and that of the side extending rightward is indicated by bR.

The bounding box calculator 202 determines whether conditions of aL<0, aR>=0, and Y>Ymin are satisfied (at step S603). If the conditions are satisfied, the bounding box calculator 202 sets Ymin at Y (at step S604). If the conditions are not satisfied, step S604 is skipped.

The bounding box calculator 202 determines whether conditions of aL>=0, aR<0, and Y<Ymax are satisfied (at step S605). If the conditions are satisfied, the bounding box calculator 202 sets Ymax at Y (at step 606). If the conditions are not satisfied, step S606 is skipped.

The bounding box calculator 202 determines whether conditions of bL>=0, bR<0, and X>Xmin are satisfied (at step S607). If the conditions are satisfied, the bounding box calculator 202 sets Xmin at X (at step S608). If the conditions are not satisfied, step S608 is skipped.

The bounding box calculator 202 determines whether conditions of bL<0, bR>=0, and X<Xmax are satisfied (at step S609). If the conditions are satisfied, the bounding box calculator 202 sets Xmax at X (at step S610). If the conditions are not satisfied, step S610 is skipped.

The bounding box calculator 202 determines whether the processings of step S S603 to S610 are finished for all of the three vertices of the triangle (at step S611). If they are finished, the bounding box calculator 202 finishes the processing for obtaining the circumscribed rectangle. If an unprocessed vertex or unprocessed vertices remain, the bounding box calculator 202 returns to step S602 to select the vertex, and repeatedly executes steps S603 to S610.

Figure 9D:
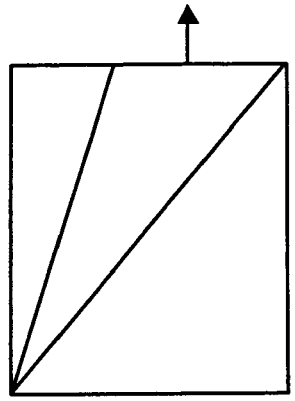
FIGS. 9A to 9H are explanatory views for classification of gradients of edge functions.
Figure 9C:
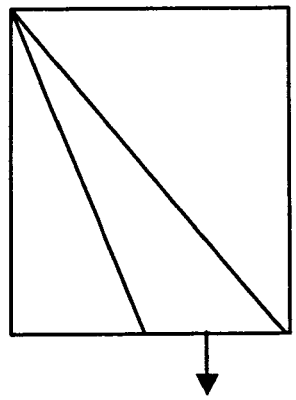
Figure 9B:
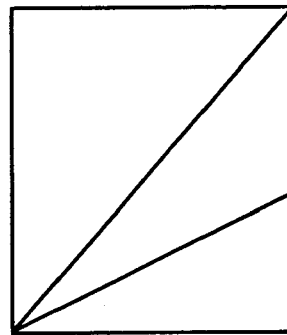
Figure 9A:
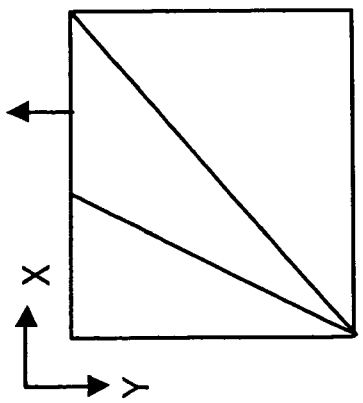

The coordinates (Xmin, Ymin) and (Xmax, Ymax) obtained when the processing is finished represent the window coordinates at the point in the upper left corner and that in the lower right corner of the circumscribed rectangle, respectively. If the triangle is a triangle as shown FIG. 9A, for example, the calculation procedures are carried out as follows.

Step S601: (Xmin, Ymin)=(0, 0), (Xmax, Ymax)=(width−1, height−1)
Step S602: Select vertex (X0, Y0).
Step S607: Since b1>=0, b2<0, and X0>Xmin, go to step S608.
Step S608: Xmin=X0
Step S611: Since two unprocessed vertices remain, return to step S602.
Step S602: Select vertex (X1, Y1).
Step S605: Since a2>=0, a0<0, and Y1<Ymax, go to step S604.
Step S606: Ymax=Y1
Step S609: Since b2<0, b0>=0, and Y1<Ymax, go to step S604.
Step S610: Ymax=X1
Step S611: Since one unprocessed vertex remains, return to step S602.
Step S602: Select vertex (X2, Y2).
Step S603: Since a0<0, a1>=0, and Y2>Ymin, go to step S604.
Step S604: Ymin=Y2
Step S611: Since no unprocessed vertex remains, finish the processing.

Figure 7A:
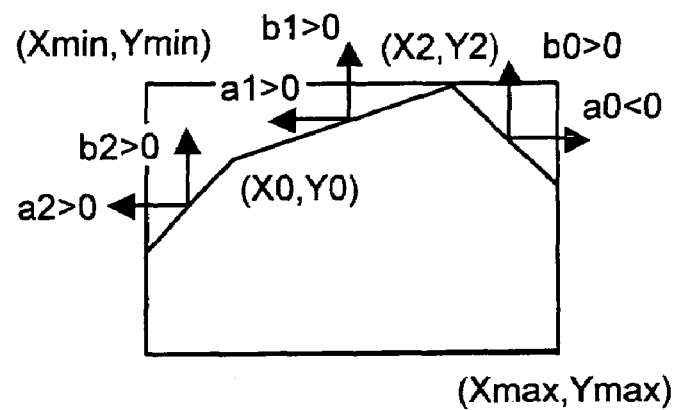
FIGS. 7A and 7B depict examples of the processing for obtaining the circumscribed rectangle of the projected images of the triangle.
Figure 7B:
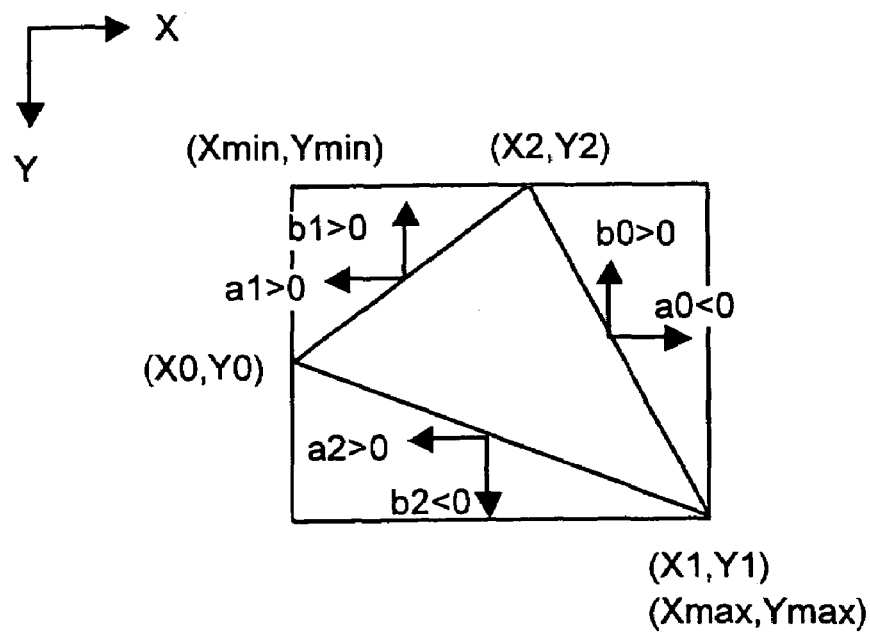
Figure 8A:
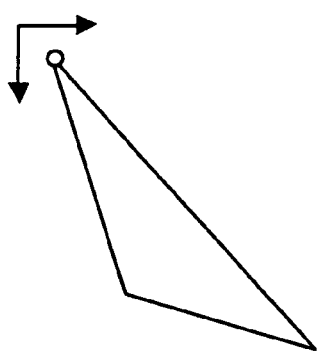
FIGS. 8A to 8H depict a shape classification method of an ordinary triangle.
Figure 8B:
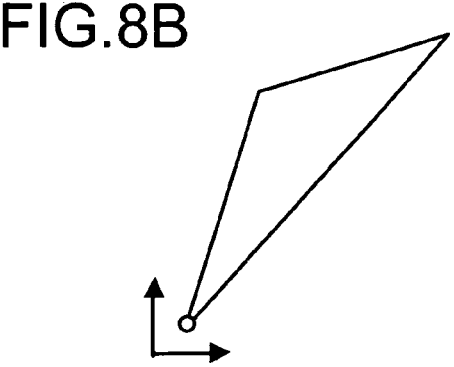
Figure 8C:
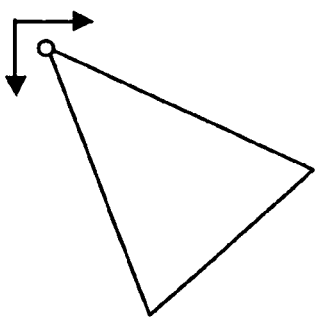
Figure 8D:
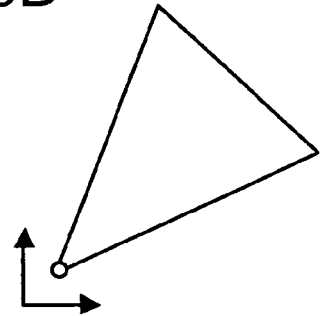
Figure 8E:
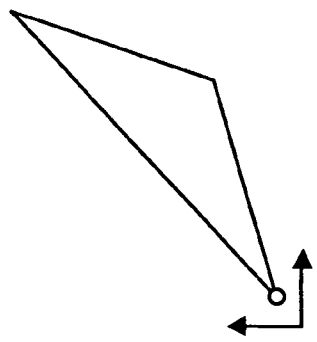
Figure 8F:
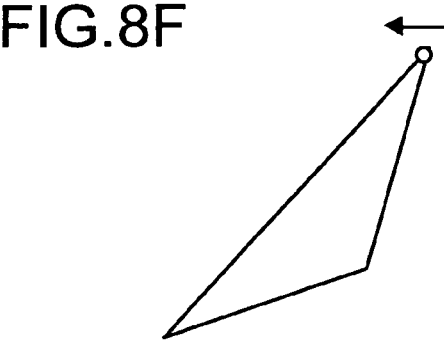
Figure 8G:
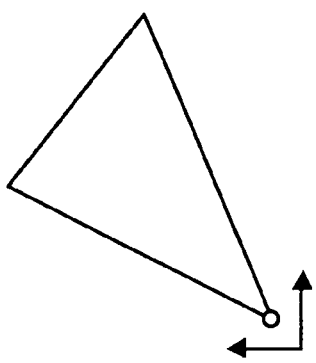
Figure 8H:
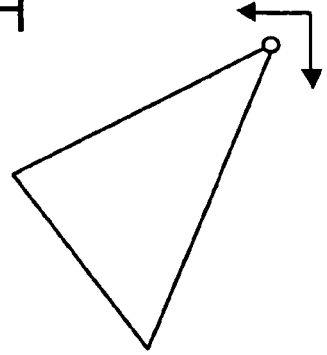

The processing procedures indicate that the point (X0, Y2) in the upper left corner and the point (X1, Y1) in the lower right corner of the circumscribed rectangle can be calculated correctly. The processing procedures are carried out if the triangle is a triangle including a vertex for which the W component of the view coordinates is smaller than zero as shown in FIG. 7B.

Step S601: (Xmin, Ymin)=(0, 0), (Xmax, Ymax)=(width−1, height−1)
Step S602: Select vertex (X0, Y0).
Step S611: Since two unprocessed vertices remain, return to step S602.
Step S602: Since the W component of the view coordinates for the vertex (X1, Y1) is smaller than zero, do not select the vertex (X1, Y1).
Step S611: Since one unprocessed vertex remains, return to step S602.
Step S602: Select vertex (X2, Y2).
Step S603: Since a0<0, a1>=0, and Y2>Ymin, go to step S604.
Step S604: Ymin=Y2
Step S611: Since no unprocessed vertex remains, finish the processing.

The processing procedures indicate that the point (0,Y2) in the upper left corner and the point (width−1, height−1) in the lower right corner of the circumscribed rectangle can be calculated correctly. The bounding box calculator 202 calculates the common region to the circumscribed rectangle thus obtained and the scissor box, thereby obtaining the bounding box.

A starting point determination processing executed by the starting point determiner 203 at step S404 shown in FIG. 4 will be explained.

Generally, the projected images of triangles are classified into eight groups. The starting point determiner 203 determines the scan starting point according to the classification. FIGS. 8A to 8H are explanatory views of the scan starting point and a progress direction of each triangle. To determine to which of the eight groups of triangles the input triangle is projected, the starting point determiner 203 compare magnitudes of the XY components in the window coordinates of the respective vertices.

If the triangle includes the vertex for which the W component in the homogeneous coordinate is smaller than zero, the vertex is not projected onto the display. As a result, a triangle of a different shape from those of the eight groups of triangles is projected. In the drawing processing apparatus in this embodiment, therefore, the projected images of triangles are classified based on a combination of the gradients (coefficients) of the edge functions instead of comparing the magnitudes of the XY components in the window coordinates of the respective vertices. According to the classification, the starting point is selected from among the four corners of the bounding box of the projected image.

The gradients (coefficients) of the edge functions are classified into five groups. A first group includes four gradients shown in FIGS. 9A to 9D. The gradients in the first group are such that an X-direction gradient (a0, a1, or a2) or a Y-direction gradient (b0, b1, or b2) is zero, that is, the edge functions are parallel to either the X axis or the Y axis. Each gradient is superposed on a boundary of the bounding box.

Figure 9E:
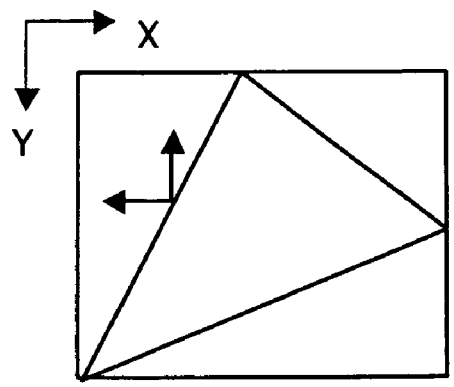

A second group includes a gradient shown in FIG. 9E. The gradient in the second group is such that both the X-direction gradient (a0, a1, or a2) and the Y-direction gradient (b0, b1, or b2) are greater than zero. The gradient divides the bounding box into an upper left region and a lower right region. The upper left region represents the outside region of the triangle, and the lower right region represents the inside region of the triangle.

Figure 9F:
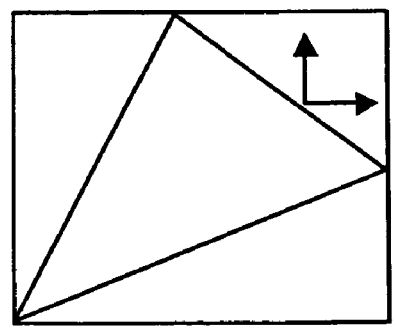

A third group includes a gradient show in FIG. 9F. The gradient in the third group is such that the X-direction gradient (a0, a1, or a2) is smaller than zero and the Y-direction gradient (b0, b1, or b2) is greater than zero. The gradient divides the bounding box into an upper right region and a lower left region. The upper right region represents the outside region of the triangle, and the lower left region represents the inside region of the triangle.

Figure 9G:
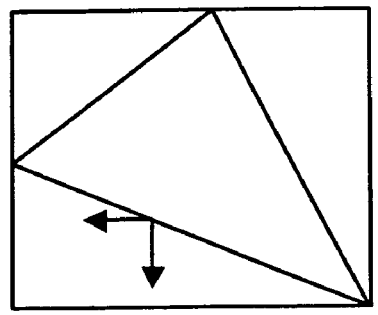

A fourth group includes a gradient shown in FIG. 9G. The gradient in the fourth group is such that the X-direction gradient (a0, 11, or a2) is greater than zero and the Y-direction gradient (b0, b1, or b2) is smaller than zero. Similarly to the third group, the gradient divides the bounding box into an upper right region and a lower left region. Differently from the third group, however, the upper right region represents the inside region of the triangle, and the lower left region represents the outside region of the triangle.

Figure 9H:
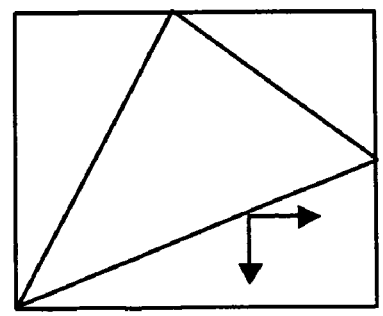

A fifth group includes a gradient shown in FIG. 9H. The gradient in the fifth group is such that both the X-direction gradient (a0, 11, or a2) and the Y-direction gradient (b0, b1, or b2) are smaller man zero. Similarly to the second group, the gradient divides the bounding box into an upper left region and a lower right region. Differently from the second group, however, the upper left region represents the inside region of the triangle, and the lower right region represents the outside region of the triangle.

In this embodiment, the gradients in the five groups of the edge functions are represented to correspond to five classification bits 0, 1, 2, 4, and 8, respectively. Attention is now paid to the correspondence between each classification bit and the outside region of the triangle formed by the gradient corresponding to the bit. At the bit 0, no outside region is present. At the bit 1, the upper left region represents the outside region. At the bit 2, the upper right region represents the outside region. At the bit 4, the lower left region represents the outside region. At the bit 8, the lower right region represents the outside region. As shown in FIGS. 9A to 9H, a 2×2 table (classification bit table) in which the bits are arranged according to the correspondences is provided in the RAM or the like so that the outside region of the triangle at each bit is represented visually. A method for classifying the projected images of the triangle using this classification bit table will be explained.

Figure 10:
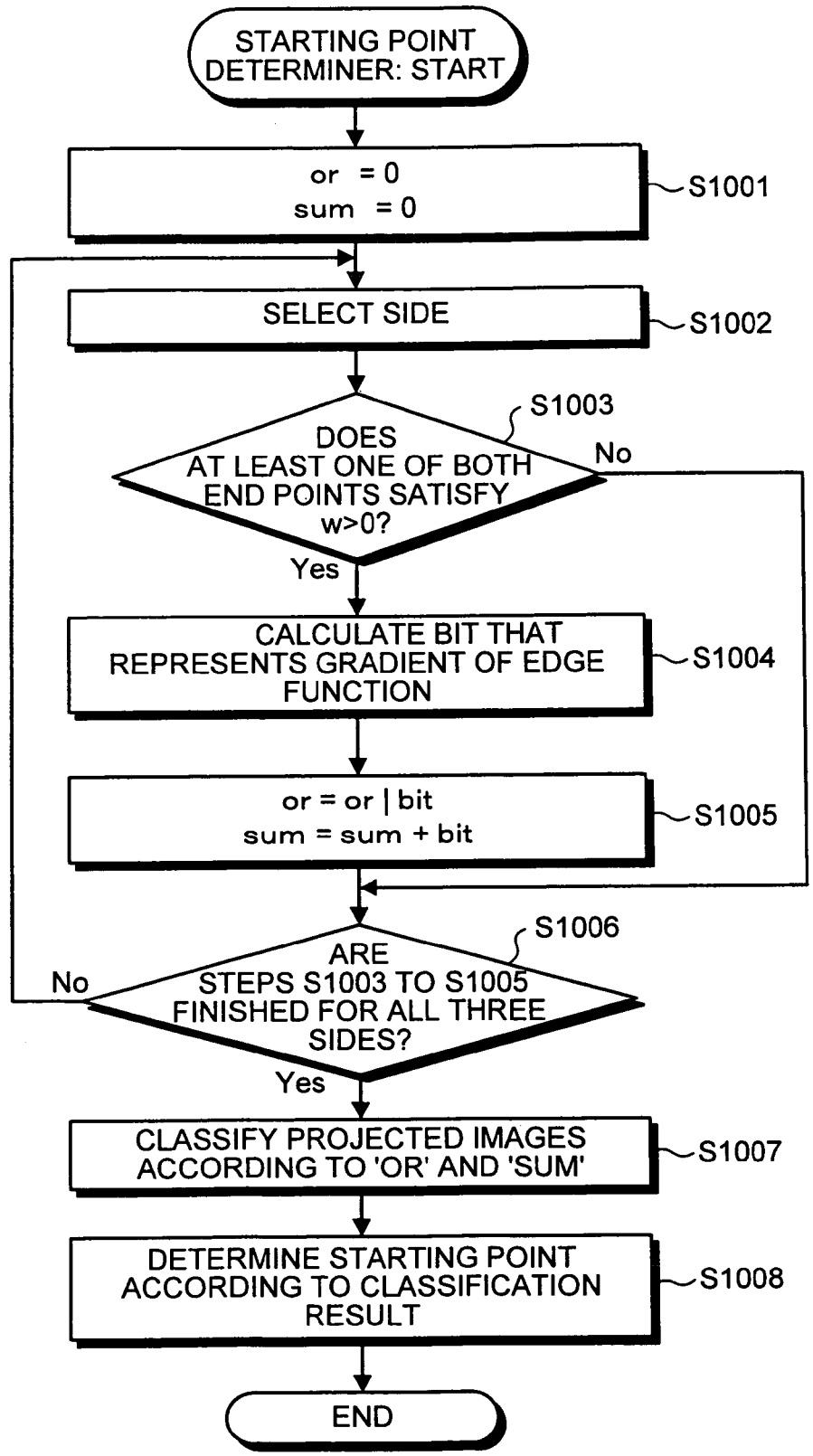
FIG. 10 is a flowchart of the processing procedures for determining a scan starting point by a starting point determiner.

FIG. 10 is a flowchart of the processing procedures for classifying the projected images of the input triangle, and for determining the starting point by the starting point determiner 203.

The starting point determiner 203 initializes variables 'or' and 'sum' to zero (at step S1001). The 'or' and 'sum' are variables for representing a combination of the gradients of the edge functions. The starting point determiner 203 selects one of the three sides of the triangle (at step S1002).

The starting point determiner 203 determines whether the W component in the homogenous coordinates for at least one of the vertices of the selected side is greater than zero, that is, whether this vertex is projected onto the projection plane (at step S1003). If the W component in the homogenous coordinates for at least one of the vertices of the selected side is greater than zero ("YES" at step S1003), the starting point determiner 203 determines that the side is projected onto the projection plane, and calculates the bit that represents the gradient of the edge function of to selected side (at step S1004). As explained, the bit is one of 0, 1, 2, 4, and 8. If the W component in the homogenous coordinates for at least one of the vertices of the selected side is not greater than zero ("NO" at step S1003), the starting point determiner 203 determines that the side is completely behind the point of view, and goes to step S1006 without executing steps S1004 to S1005.

The starting point determiner 203 calculates a logical OR between the variable 'or' and the bit, and sets 'or' at a calculation result. The starting point determiner 203 also calculates an arithmetic sum between the variable 'sum' and the bit, and sets 'sum' at a calculation result (at step S1005).

The starting point determiner 203 determines whether steps S1003 to S1005 are finished for all the three sides of the triangle (at step S1006). If step S1003 to S1005 are finished for all the three sides, the starting point determiner 203 goes to step S1007. If an unprocessed triangle or unprocessed triangles remain, the starting point determiner 203 returns to step S1002 at which the starting point determiner 203 selects the side, and repeatedly executes steps S1003 to S1005.

If steps S1003 to S1005 are finished for all the three sides of the triangle, the starting point determiner 203 classifies the projected images of the triangle based on the variables 'or' and 'sum'.

Figure 11:
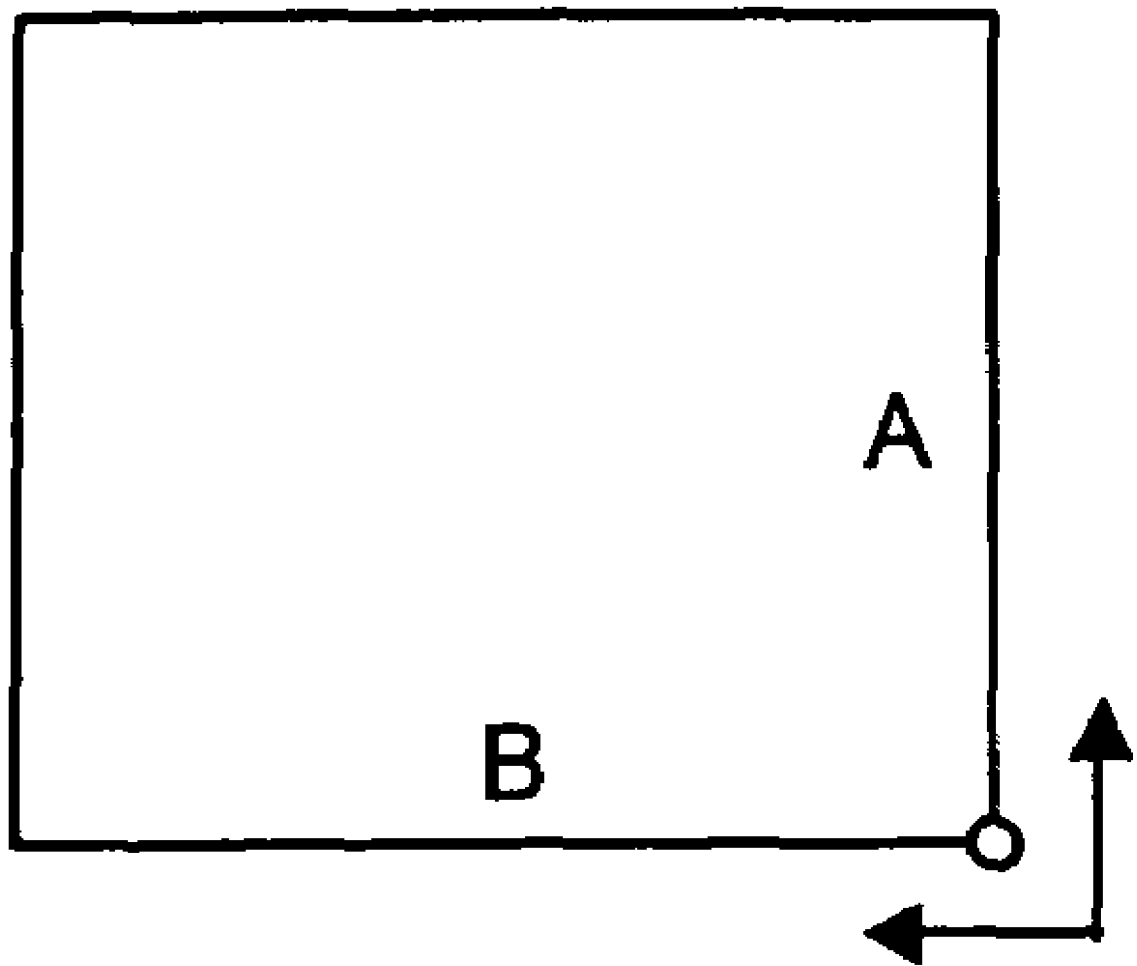
FIG. 11 depicts the projected image of the triangle at "or=0"

At 'or'=0, the edge functions of the respective sides correspond to the bit 0, and 'or'=0|0|0=0 and 'sum'=0+0+0=1 as shown in FIG. 11.

Figure 12C:
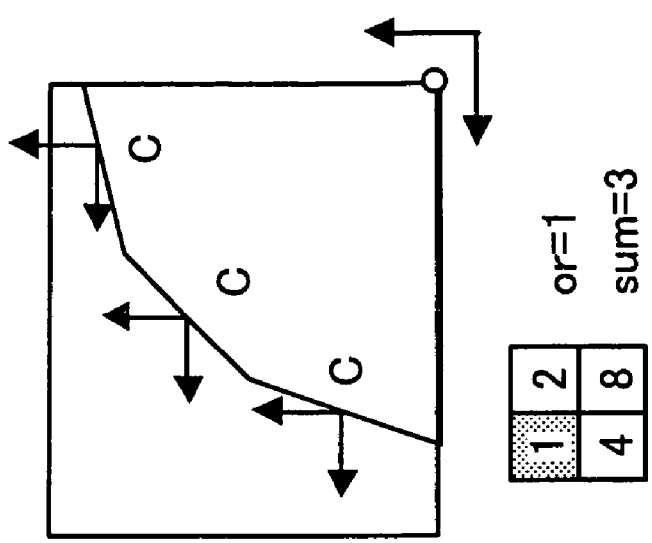
FIGS. 12A to 12C depict the projected images of the triangle at "or=1"
Figure 12B:
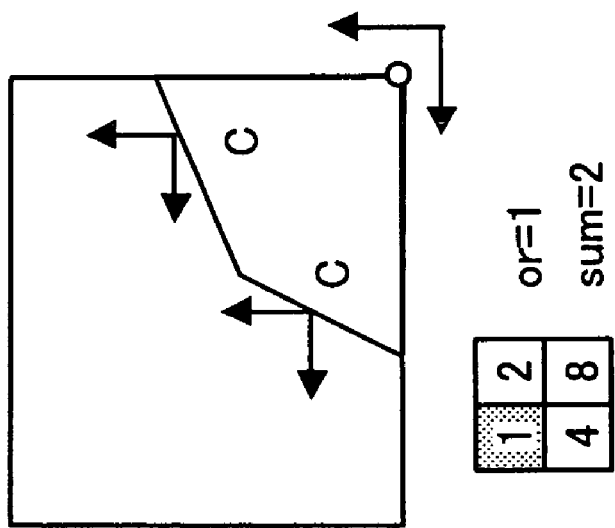
Figure 12A:
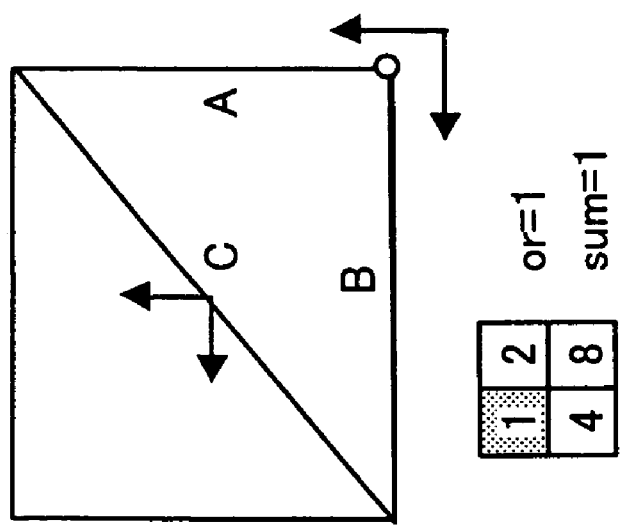

At 'or'=1, the projected images are classified to three groups of 'sum'=1, 2, and 3, respectively. The projected image in the group of 'sum'=1 is a right-angled triangle having a right angle in the lower right corner. Since two sides in the right angle are parallel to the X axis or the Y axis, the edge functions of the two sides correspond to the bit 0. The remaining one side corresponds to the bit 1. Therefore, 'or'=0|0|1=1 and 'sum'=0+0+1=1. For the projected image in the group of 'sum'=2, the two sides correspond to the bit 1. Since the remaining one side is completely behind the point of view, the remaining one side corresponds to the bit 0. Therefore, 'or'=1|1|0=1 and 'sum'=1+1+0=2. For the projected image in the group of 'sum'=3, the three sides correspond to the bit 1. Therefore, 'or'=1|1|1=1 and 'sum'=1+1+1=3. Since the triangle has only three sides, the number of sides of the projected image is a maximum of three. Accordingly, at 'or'=1, the projected images are only three types at 'sum'=1, 2, and 3 shown in FIGS. 12A to 12C.

Figure 13C:
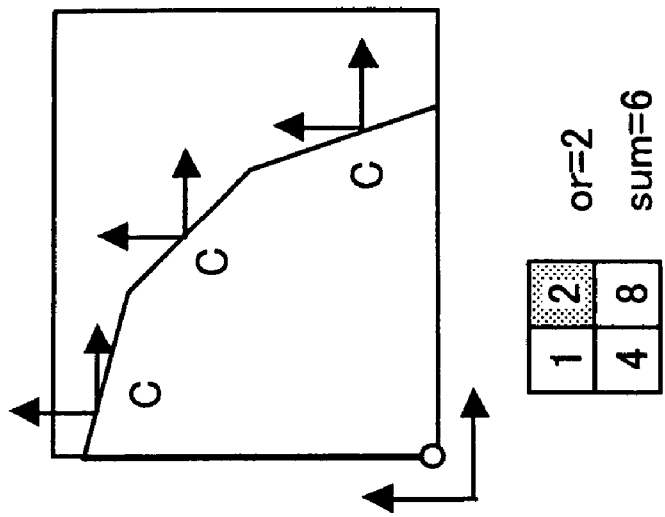
FIGS. 13A to 13C depict the projected images of the triangle at "or=2"
Figure 13B:
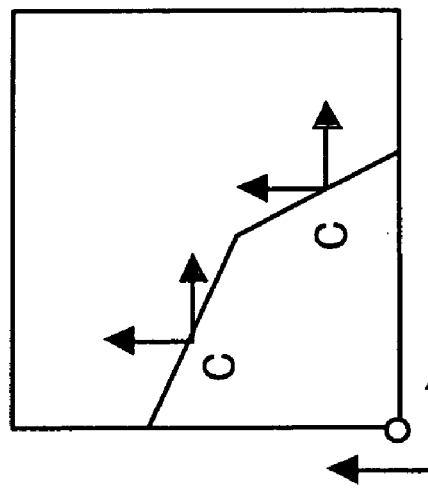
Figure 13A:
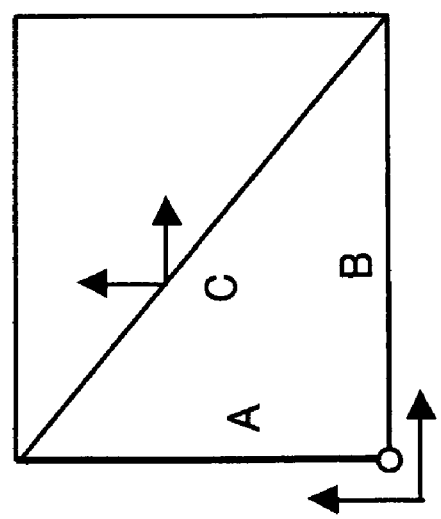
Figure 14A:
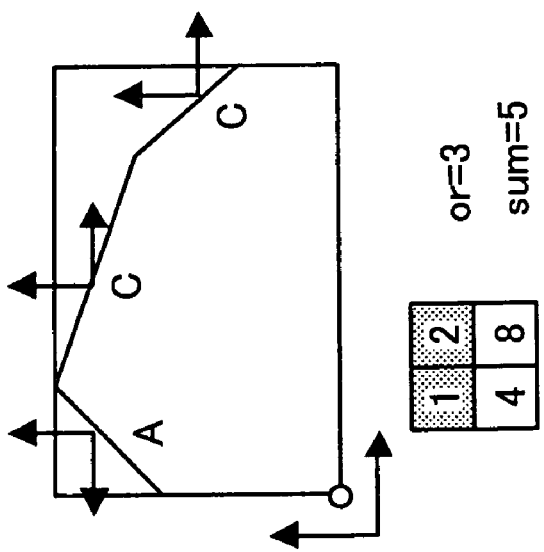
FIGS. 14A to 14C depict the projected images of the triangle at "or=3"
Figure 14B:
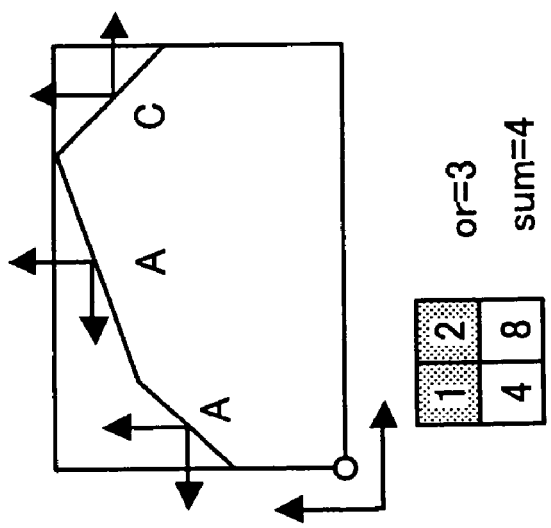
Figure 14C:
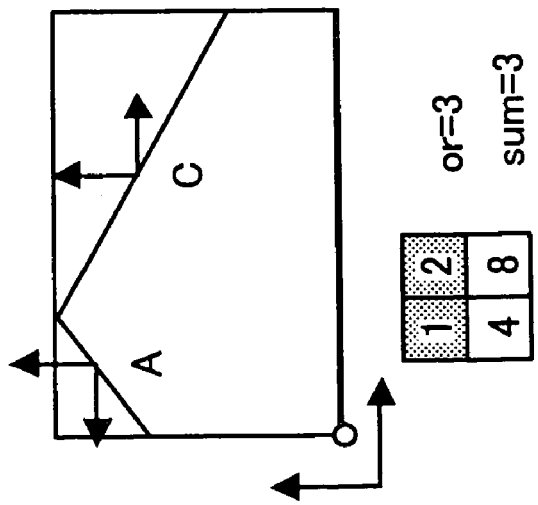
Figure 15A:
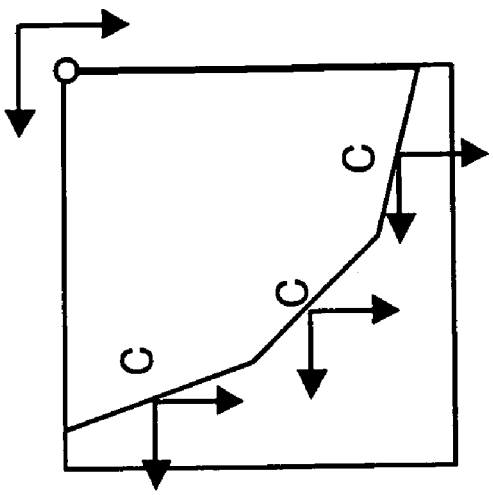
FIGS. 15A to 15C depict the projected images of the triangle at "or=4"
Figure 15B:
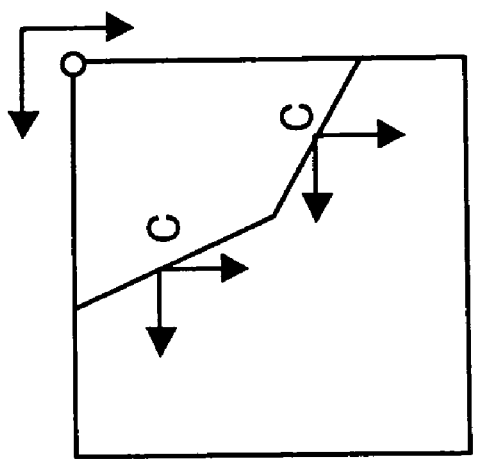
Figure 15C:
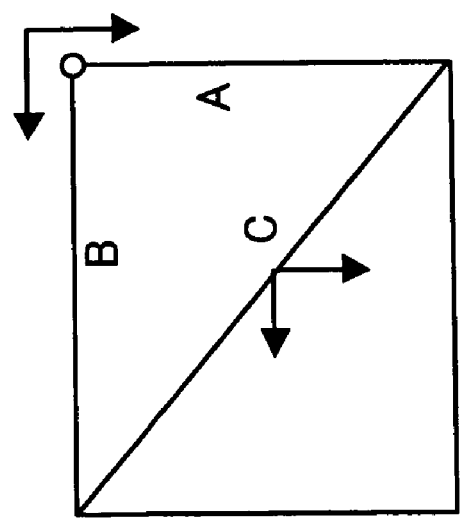
Figure 16C:
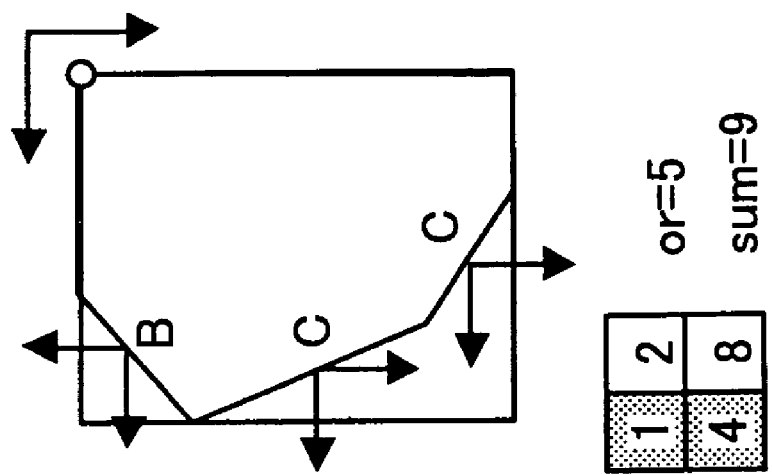
FIGS. 16A to 16C depict the projected images of the triangle at "or=5"
Figure 16B:
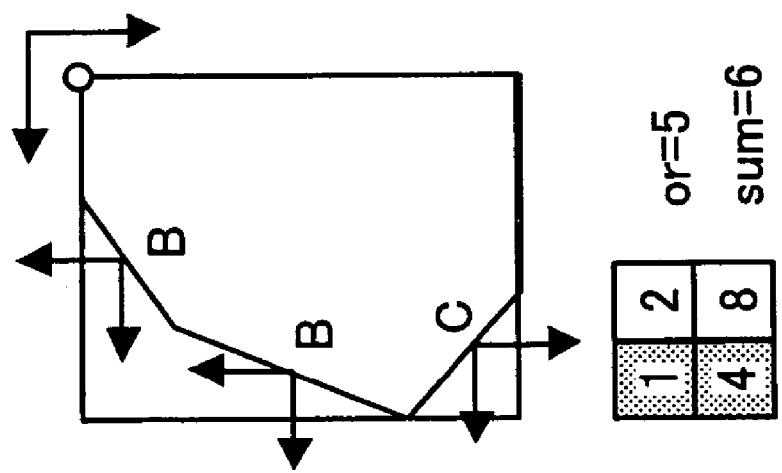
Figure 16A:
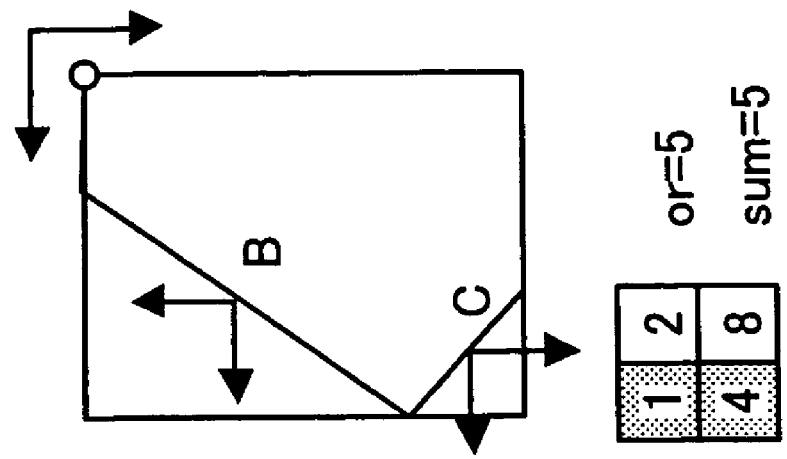
Figure 17C:
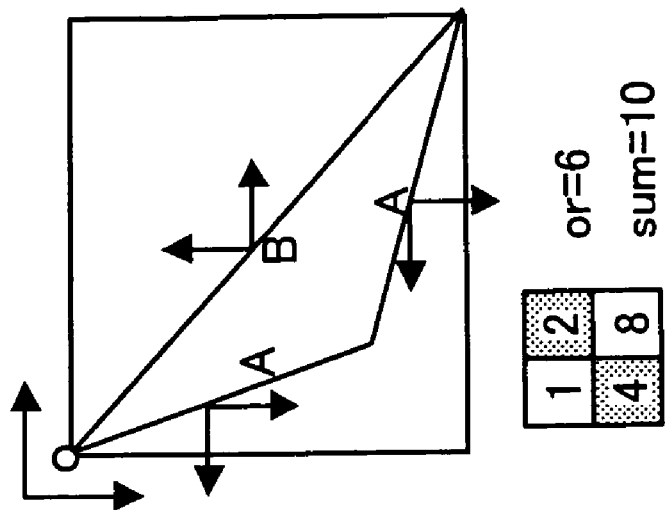
FIGS. 17A to 17C depict the projected images of the triangle at "or=6"
Figure 17B:
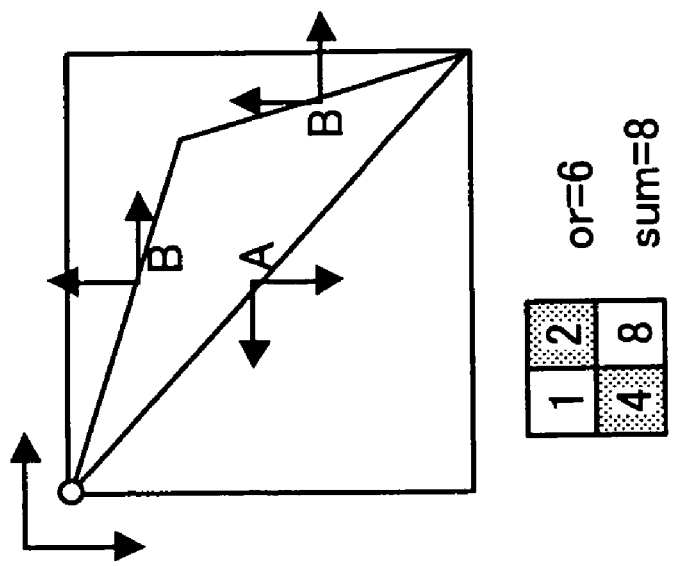
Figure 17A:
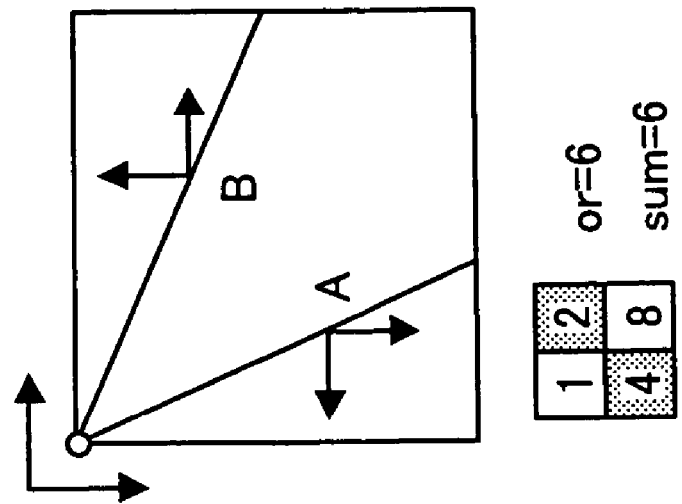
Figure 18:
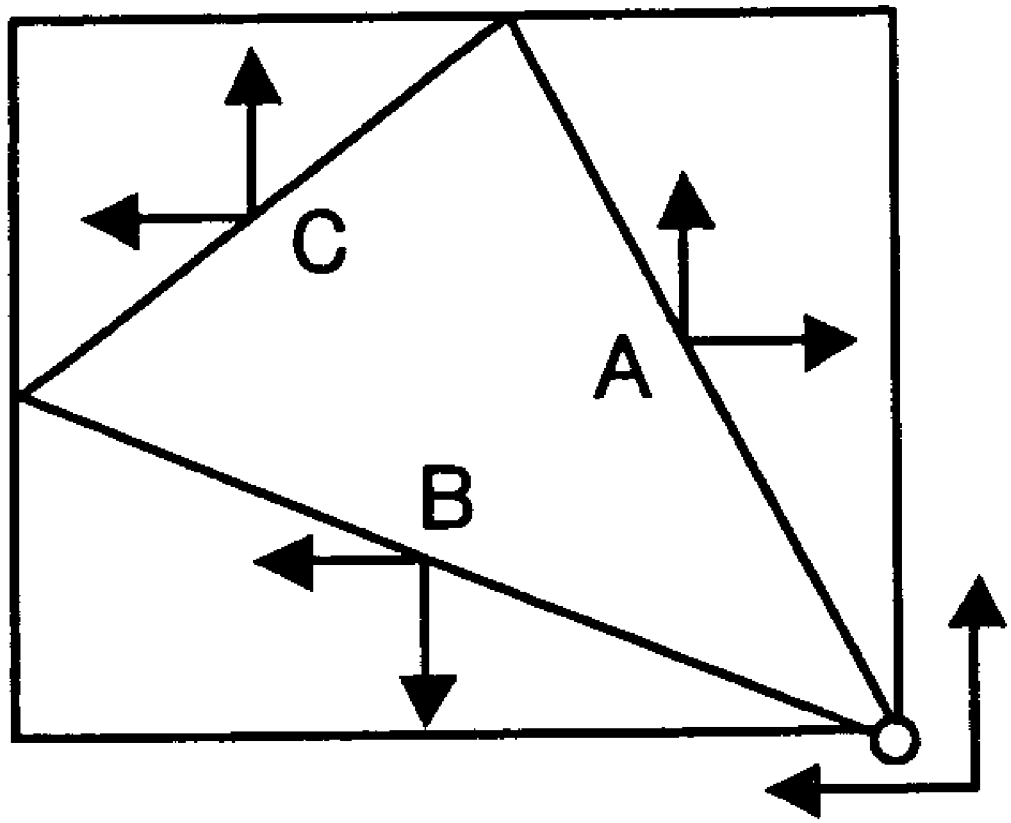
FIG. 18 depicts the projected image of the triangle at "or=7"
Figure 20C:
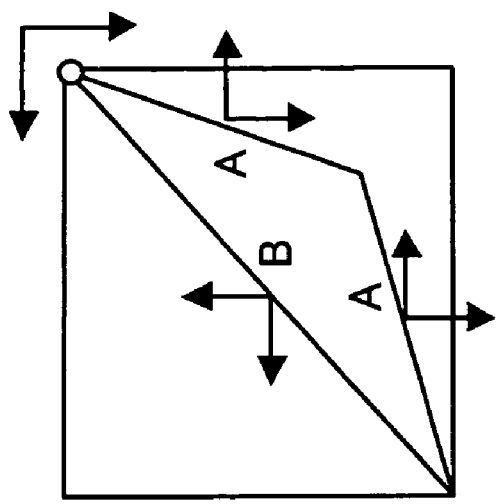
FIGS. 20A to 20C depict the projected images of the triangle at "or=9"
Figure 20B:
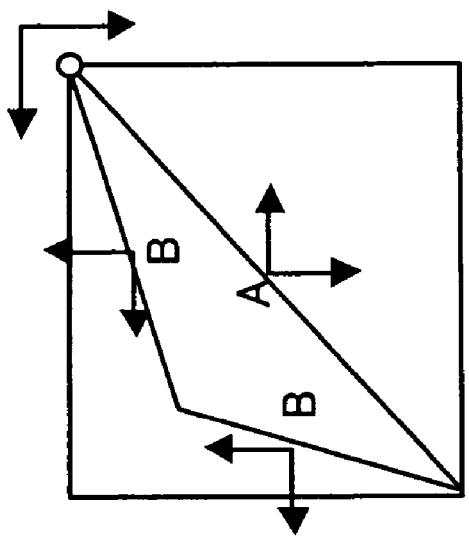
Figure 20A:
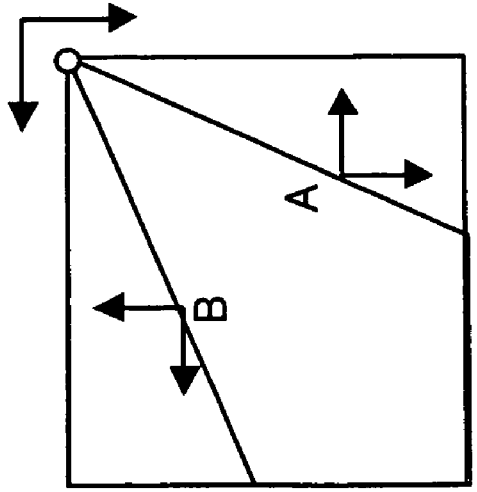
Figure 21A:
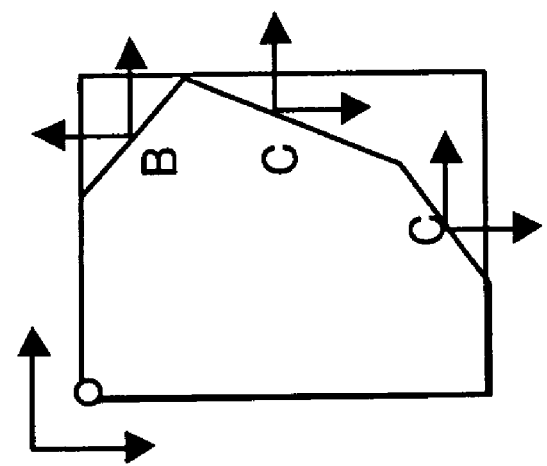
FIGS. 21A to 21C depict the projected images of the triangle at "or=10"
Figure 21B:
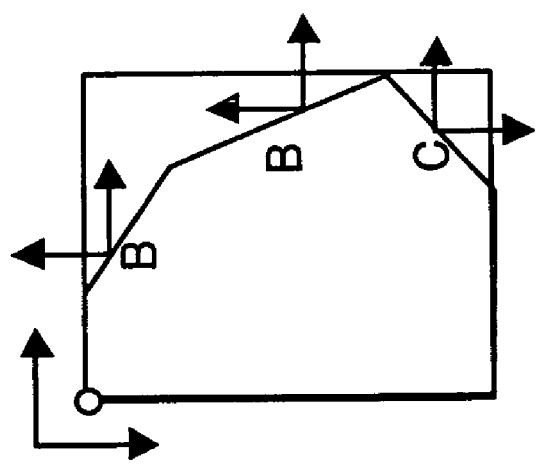
Figure 21C:
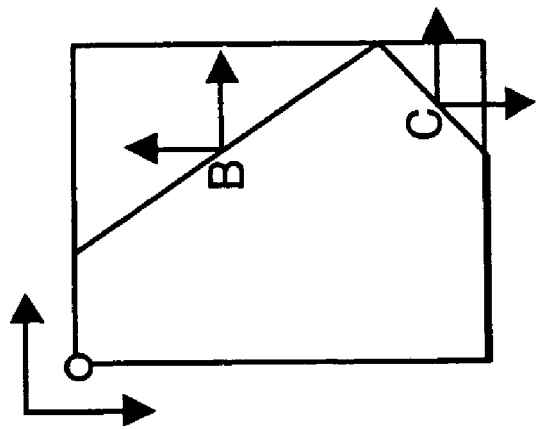
Figure 22:
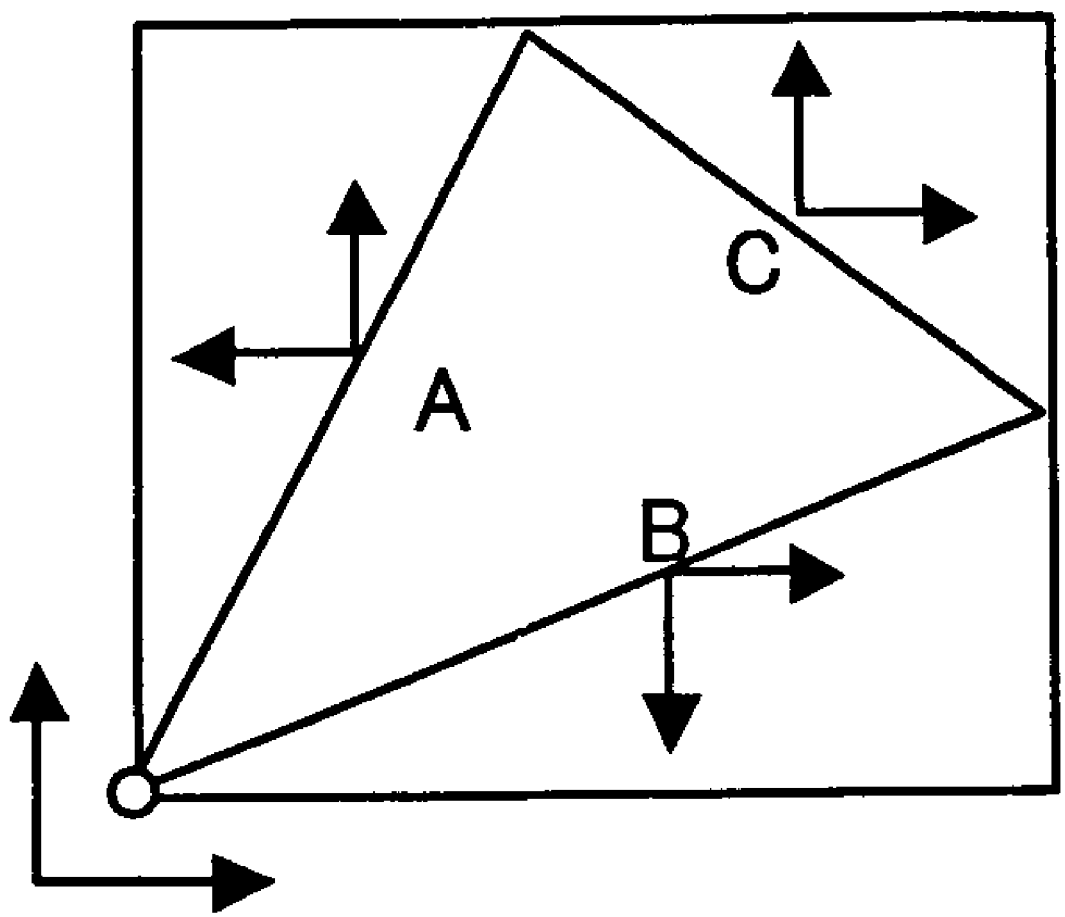
FIG. 22 depicts the projected image of the triangle at "or=11"
Figure 23:
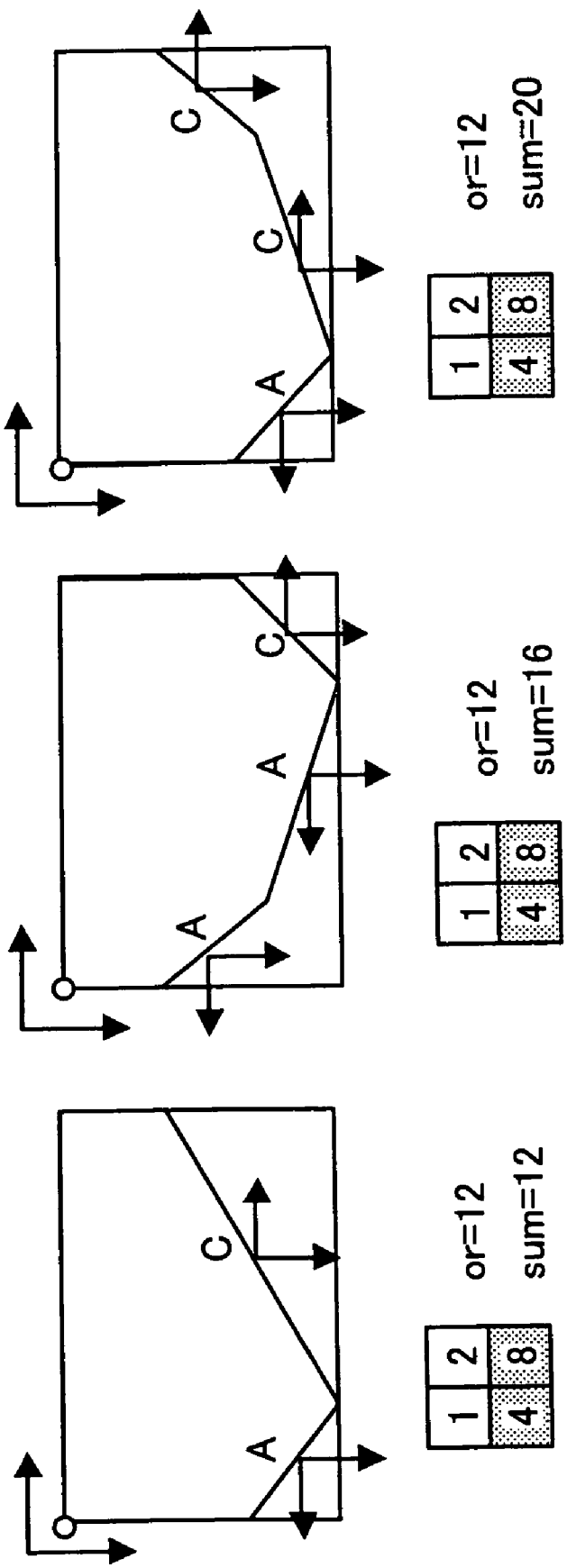
FIGS. 23A to 23C depict the projected images of the triangle at "or=12"
Figure 24:
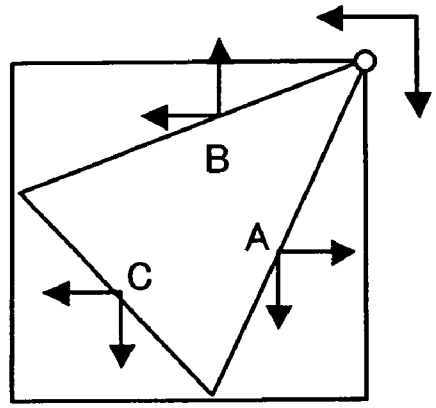
FIG. 24 depicts the projected image of the triangle at "or=13"
Figure 25:
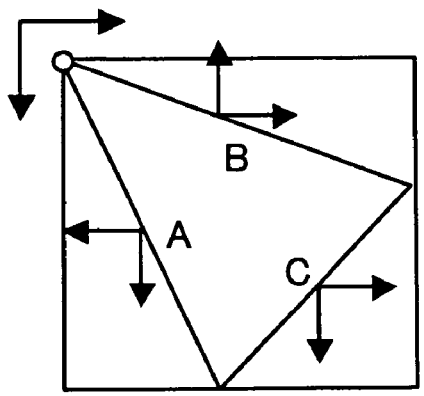
FIG. 25 depicts the projected image of the triangle at "or=14"

At 'or'=2 and the following, the projected images are classified similarly to 'or'=1. At 'or'=2, the projected images are classified into three groups of 'sum'=2, 4, and 6, respectively, as shown in FIGS. 13A to 13C. At 'or'=3, the projected images are classified into three groups of 'sum'=3, 4, and 5, respectively, as shown in FIGS. 14A to 14C. At 'or'=4, the projected images are classified into three groups of 'sum'=4, 8, and 12, respectively, as shown in FIGS. 15A to 15C. At 'or'=5, the projected images are classified into three groups of 'sum'=5, 6, and 9, respectively, as shown in FIGS. 16A to 16C. At 'or'=6, the projected images are classified into three groups of 'sum'=6, 8, and 10, respectively, as shown in FIGS. 17A to 17C. At 'or'=7, the number of the projected images is only one as shown in FIG. 18. At 'or'=8, the projected images are classified into three groups of 'sum'=8, 16, and 24, respectively, as shown in FIGS. 19A to 19C. At 'or'=9, the projected images are classified into three groups of 'sum'=9, 10, and 17, respectively, as shown in FIGS. 20A to 20C. At 'or'=10, the projected images are classified into three groups of 'sum'=10, 12, and 18, respectively, as shown in FIGS. 21A to 21C. At 'or'=11, the number of the projected images is only one as shown in FIG. 22. At 'or'=12, the projected images are classified into three groups of 'sum'=12, 16, and 20, respectively, as shown in FIGS. 23A to 23C. At 'or'=13, the number of the projected images is only one as shown in FIG. 24. At 'or'=14, the number of the projected images is only one as shown in FIG. 25.

Accordingly, the total number of groups of the projected images is 35. Since the is no other combination of the variables 'or' and 'sum', all the projected images are classified into the 35 groups.

Referring back to FIG. 10, if the starting point determiner 203 thus classifies the projected images, the starting point determiner 203 determines a rasterization scan starting point according to a classification result of the projected images. In classification views of FIG. 11 to FIG. 25, the point indicated by a circle among the four corners of the bounding box is the starting point.

Figure 26A:
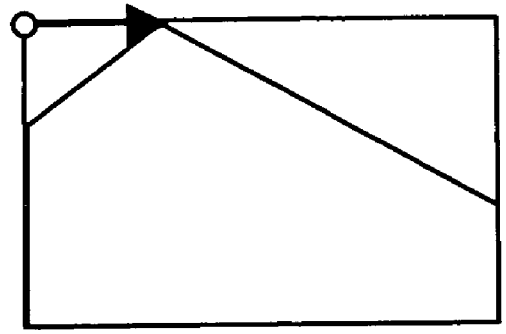
FIGS. 26A and 26B are illustrations of unnecessary scan for the projected images of the triangle at "or=3" and "sum=3"
Figure 26B:
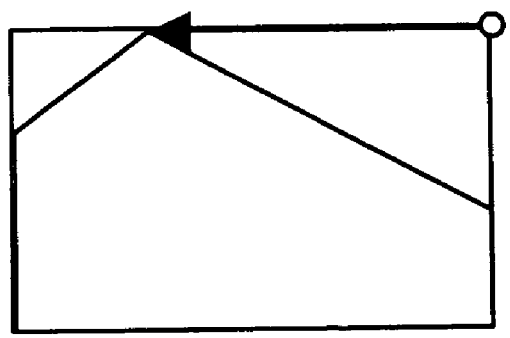

As the scan starting point, the point that does not belong to the outside region of the triangle is selected from the four corner of the bounding box. At 'or'=3 and 'sum'=3 shown in FIGS. 14A to 14C, for example, the upper left point and the upper right point in the four corners of the bounding box belong to the outside region of the triangle. Therefore, these points are not selected as the scan starting point. If a scan is started from one of these points, unnecessary scan of scanning the outside region of the triangle is carried out as indicated by arrows in FIGS. 26A and 26B. If the scan is started from the lower left point or the lower right point that does not belong to the outside region of the triangle, such unnecessary scan is not carried out.

In summary, the correspondence between the classification of the projected images and the starting point positions is as follows:

or=0: The starting point: arbitrary one of the four corners of the bounding box or=6, 8, 10, 12, and 14: The starting point: The upper left corner of the bounding box or=2, 3, and 11: The starting point: The lower left corner of the bounding box or=1 and 7: The starting point: The lower right corner of the bounding box or=4, 5, 9, and 13: The starting point: The upper right corner of the bounding box In this embodiment, the variable 'sum' is used to indicate that all the projected images are thoroughly classified. However, in the correspondence shown above, the value of the variable 'sum' is irrelevant to the starting point position. Therefore, the starting point determiner 203 may carry out the processing while ignoring the variable 'sum'. For example, when the processing of the starting point determiner 203 is executed by hardware, steps related to the variable 'sum' shown in FIG. 10 may be omitted. The starting point determiner 203 determines instead the starting point from the four corners of the bounding box according to the following procedures.

A sense point determination processing used for the inside and outside determination of each side of the triangle, and executed by the sense point determiner 204 at step S405 shown in FIG. 4 will be explained.

Figure 27A:
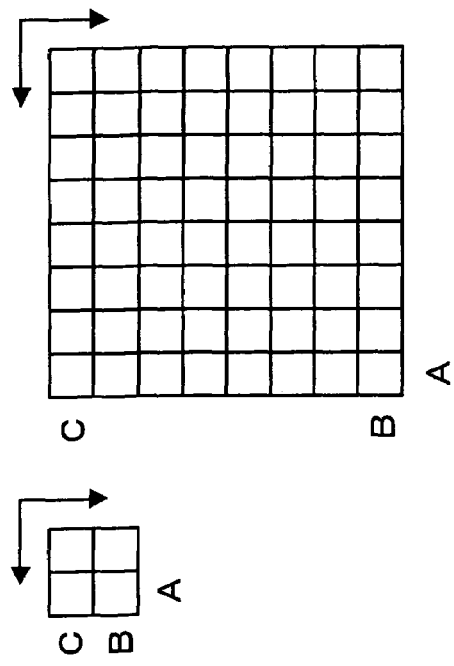
FIGS. 27A to 27D depict arrangement of sense points for a stamp and an area.
Figure 27B:
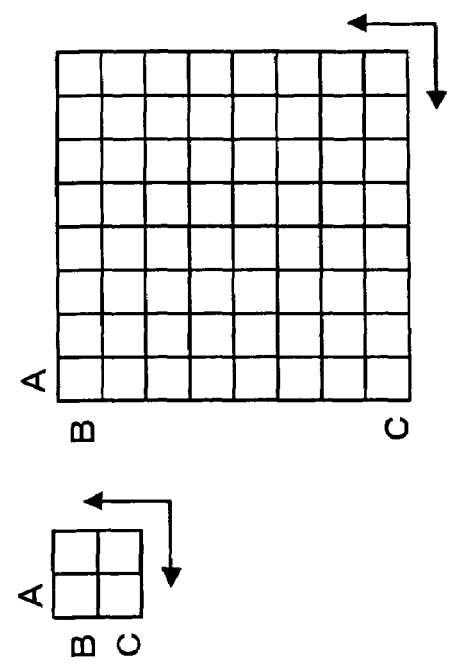
Figure 27C:
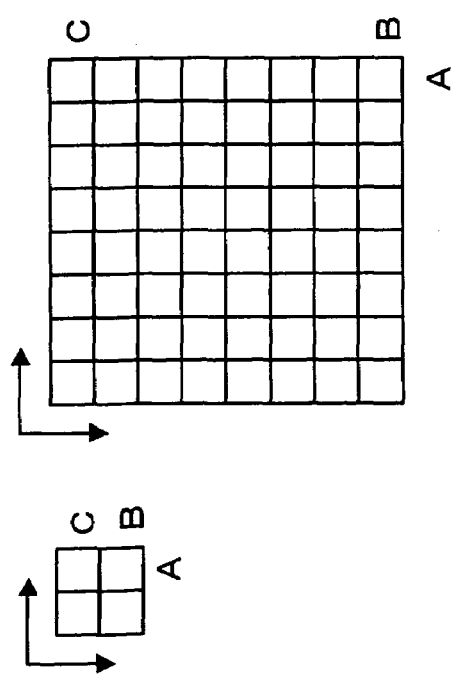
Figure 27D:
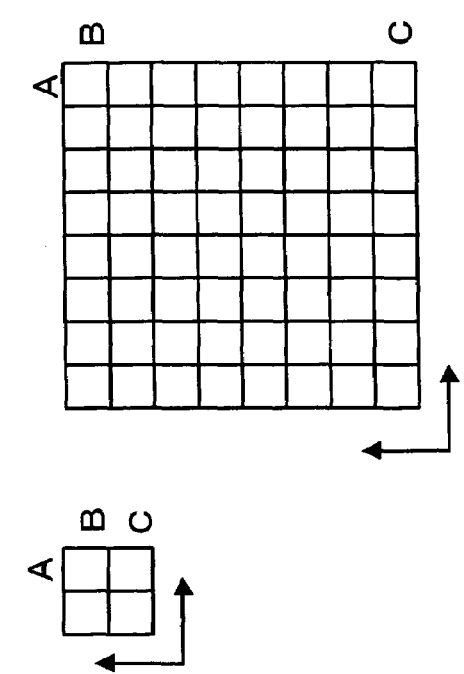

Three points of A, B, and C are provided as the sense points. The three points are arranged to be always at the same positions relative to the scan direction. The positions of the points are determined for two rectangular regions of the stamp and the area. For example, if the starting point is in the upper left corner of the bounding box, i.e., the scan is performed in a lower right direction, the sense points for the stamp and the area are arranged as shown in FIG. 27A. Likewise, if the starting point is in the upper right corner of the bounding box, the sense points therefor are arranged as shown in FIG. 27B. If the starting point is in the upper left corner of the bounding box, the sense points therefor are arranged as shown in FIG. 27C. If the starting point is in the lower left corner of the bounding box, the sense points therefor are arranged as shown in FIG. 27D.

Figure 28:
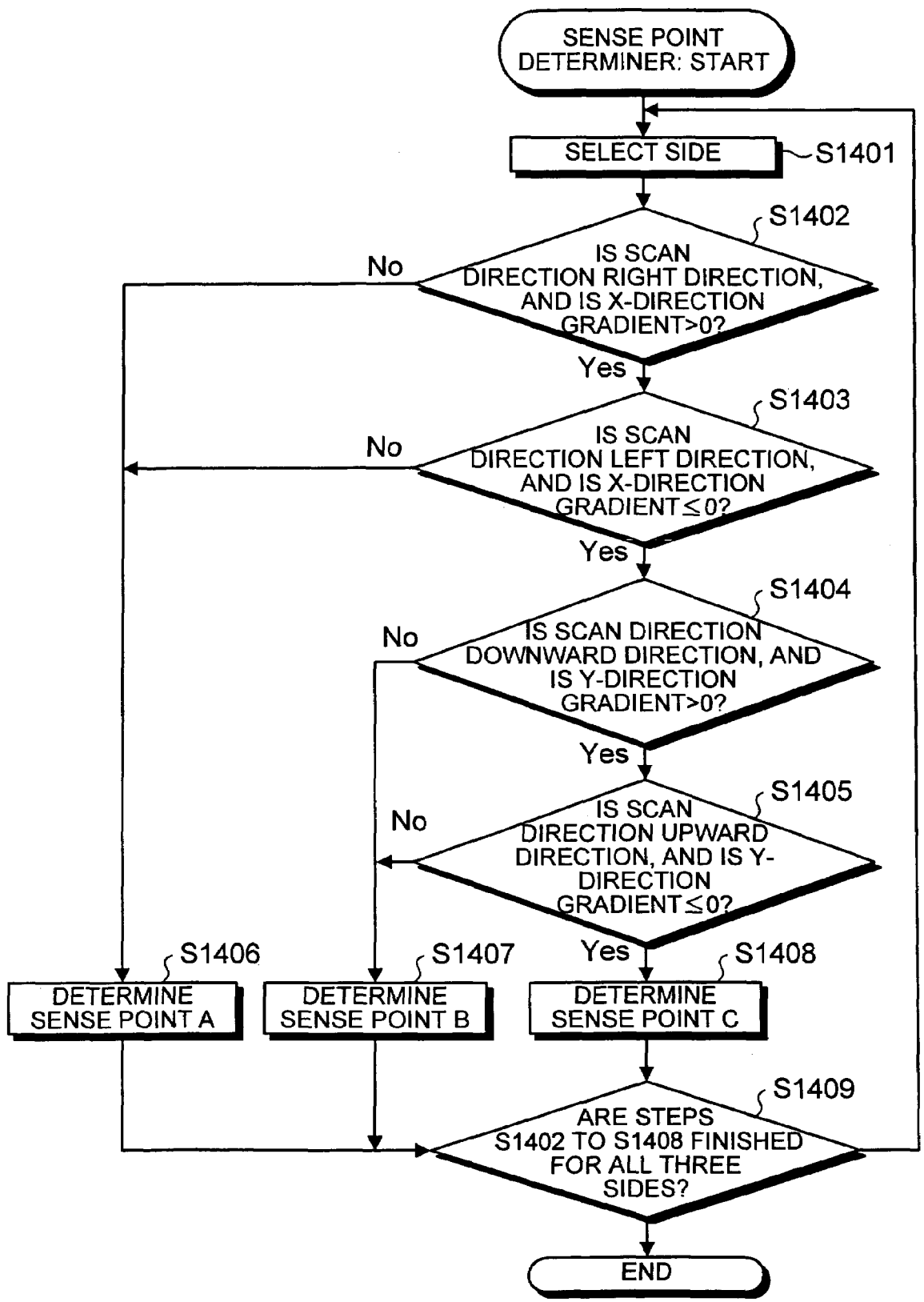
FIG. 28 is a flowchart of the procedures for a sense point determination processing performed by a sense point determiner.

The sense point determiner 204 selects the sense point used for the inside and outside determination of each side of the triangle from among the points A, B, and C based on the relationship between the scan direction and the gradients (edge coefficients) of the edge functions. FIG. 28 is a flowchart of the procedures for the sense point determination processing performed by the sense point determiner 204.

The sense point determiner 204 selects one side from among the three sides of the triangle (at step S1401). The sense point determiner 204 determines whether conditions that the scan is performed in a right direction and that the X-direction gradient of the selected side is greater than zero are satisfied (at step S1402). If the conditions are not satisfied, the sense point determiner 204 determines that the point A is the sense point used the inside and outside determination of each side of the triangle, and goes to step S1409 (at step S1406).

If the conditions are satisfied at step S1402, the sense point determiner 204 determines whether conditions that the scan is performed in a left direction and that the X-direction gradient of the selected side is equal to or smaller than zero are satisfied (at step S1403). If the conditions are not satisfied, the sense point determiner 204 determines that the point A is the sense point used for the inside and outside determination of each side of the triangle, and goes to step S1409 (at step S1406).

If the conditions are satisfied at step S1403, the sense point determiner 204 determines whether conditions that the scan is performed in a downward direction and that the Y-direction gradient of the selected side is greater than zero are satisfied (at step S1404). If the conditions are not satisfied at step S1404, the sense point determiner 204 determines that the point B is the sense point used for the inside and outside determination of each side of the triangle, and goes to step S1409 (at step S1401).

If the conditions are satisfied at step S1404, the sense point determiner 204 determines whether conditions that the scan is performed in an upward direction and that the Y-direction gradient of the selected side is equal to or smaller than zero are satisfied (at step S1405). If the conditions are not satisfied at step S1405, the sense point determiner 204 determines that the point B is the sense point used for the inside and outside determination of each side of the triangle, and goes to step S1409 (at step S1401).

If the conditions are satisfied at step S1405, the sense point determiner 204 determines the point C is the sense point for the inside and outside determination of each side of the triangle (at step S1408). The sense point determiner 204 determines whether step S S1402 to S1408 are finished for all the three sides of the triangle (at step S1409). If they are finished for all the three sides, the sense point determiner 204 finishes the processing for determining the sense point for the inside and outside determination of each side of the triangle. If an unprocessed side remains, the sense point determiner 204 repeatedly executes steps S1402 to S1408.

Through the processing, the sense point determiner 204 determines the sense point for the inside and outside determination of each side of the triangle from the points A, B, and C. In the classification views of the projected images shown in FIG. 11 to FIG. 25, the sense points allocated to the respective sides by these procedures are shown. The traverser 300 connected in rear of the setup processor 200 determines whether the sense points obtained by this messing are inside of the respective sides, thereby determining the stamp or area to be scanned next.

As explained, the setup processor 200 according to this embodiment classifies the projected images of the triangle not by the comparison of the magnitudes of the XY components in the window coordinates for the vertices but by the combination of the gradients (edge coefficients) of the edge functions, and determines the scan starting point from among the four corners of the bounding box according to the classification. Therefore, even if a part of the input triangle is behind the point of view, the setup processor 200 can generate the setup data by the uniform processing without the need of a special processing similarly to an instance in which all the regions of the triangle are projected onto the projection plane.

A processing of the traverser 300 will next be explained. The traverser 300 transmits the generated pixel data to one of the pixel processors 4 for every area. Therefore, the traverser 300 moves the stamp into the next area after a scan to the stamp in one area is finished.

Figure 49:
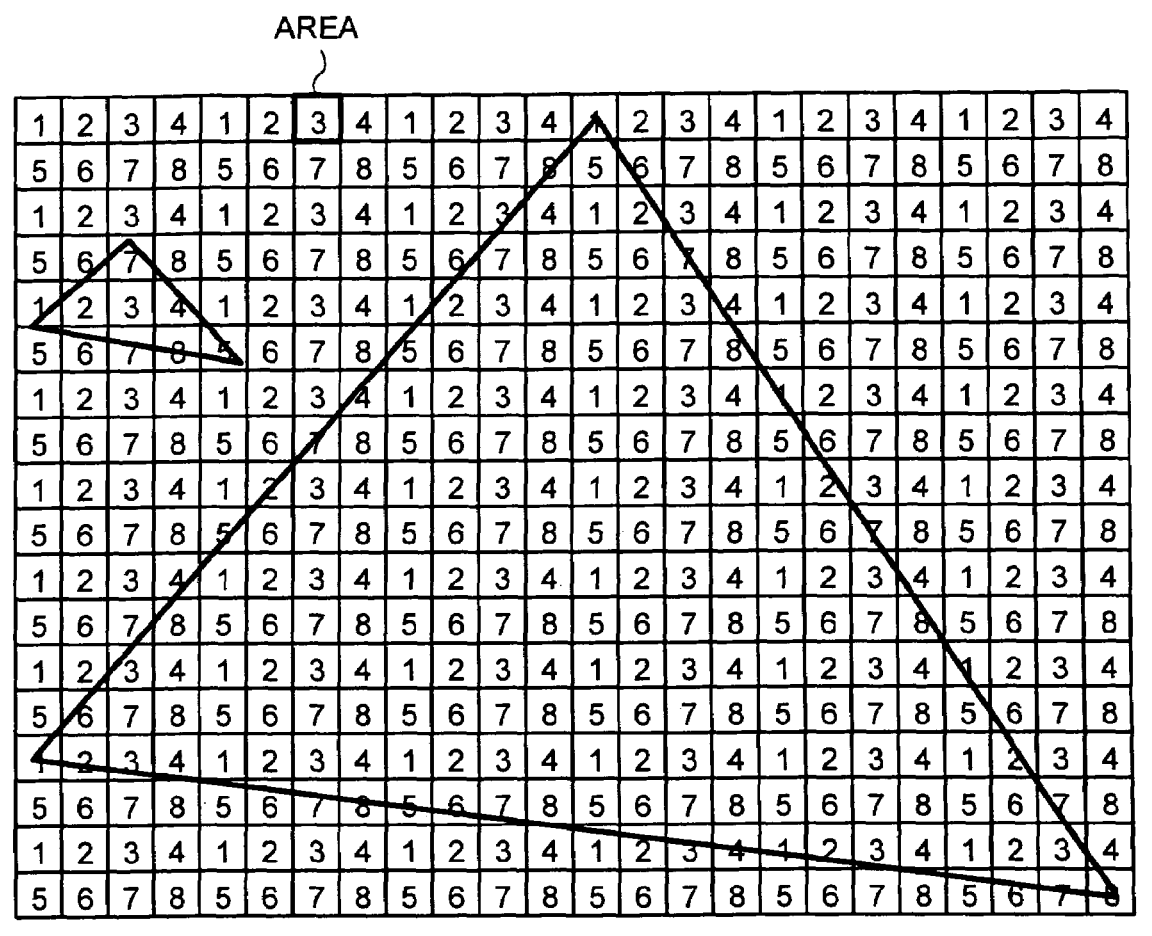

The allocation of the areas and the pixel processors 103 is carried out by adopting the configuration of interleaving so as to distribute a load on the pixel processors 103. If the number of the pixel processors 103 is eight, for example, the allocation of the areas and the pixel processors 103 is carried out as shown in FIG. 49. In FIG. 49, numbers 1 to 7 given in the respective areas represent the numbers of the pixel processors 103, respectively.

The scan is performed while following the adjacent areas. Therefore, by allocating the areas and the pixel processors 103 as shown in FIG. 10, the load on the pixel processors 103 is distributed and a pixel processing performance is improved. For example, if the scan is performed from lower right to upper left of the smaller triangle shown in FIG. 49, the load is averagely applied to the eight pixel processors 103 in an order of the pixel processors 103 numbered 5, 8, 7, 6, 5, 4, 3, 2, 1 8, 7, and 6.

However, even if the areas and the pixel processors 103 are thus allocated, the load is concentrated on half of the pixel processors 103 and the pixel processing performance is deteriorated during rasterization of a very large triangle. In FIG. 49, if the larger triangle is to be scanned from lower right to upper left, for example, the pixel processors 103 often process the areas repeatedly in an order of the pixel processors 103 numbered 4, 3, 2, and 1 or an order of 8, 7, 6, and 5. As a result, when the processing concentrates on the pixel processors 103 numbered 4, 3, 2, and 1, the pixel processors 103 numbered 8, 7, 6, and 5 fail to perform the processing. Conversely, when the processing concentrates on the pixel processors 103 numbered 8, 7, 6, and 5, the pixel processors 104 numbered 4, 3, 2, and 1 fail to perform the processing.

Figure 50:
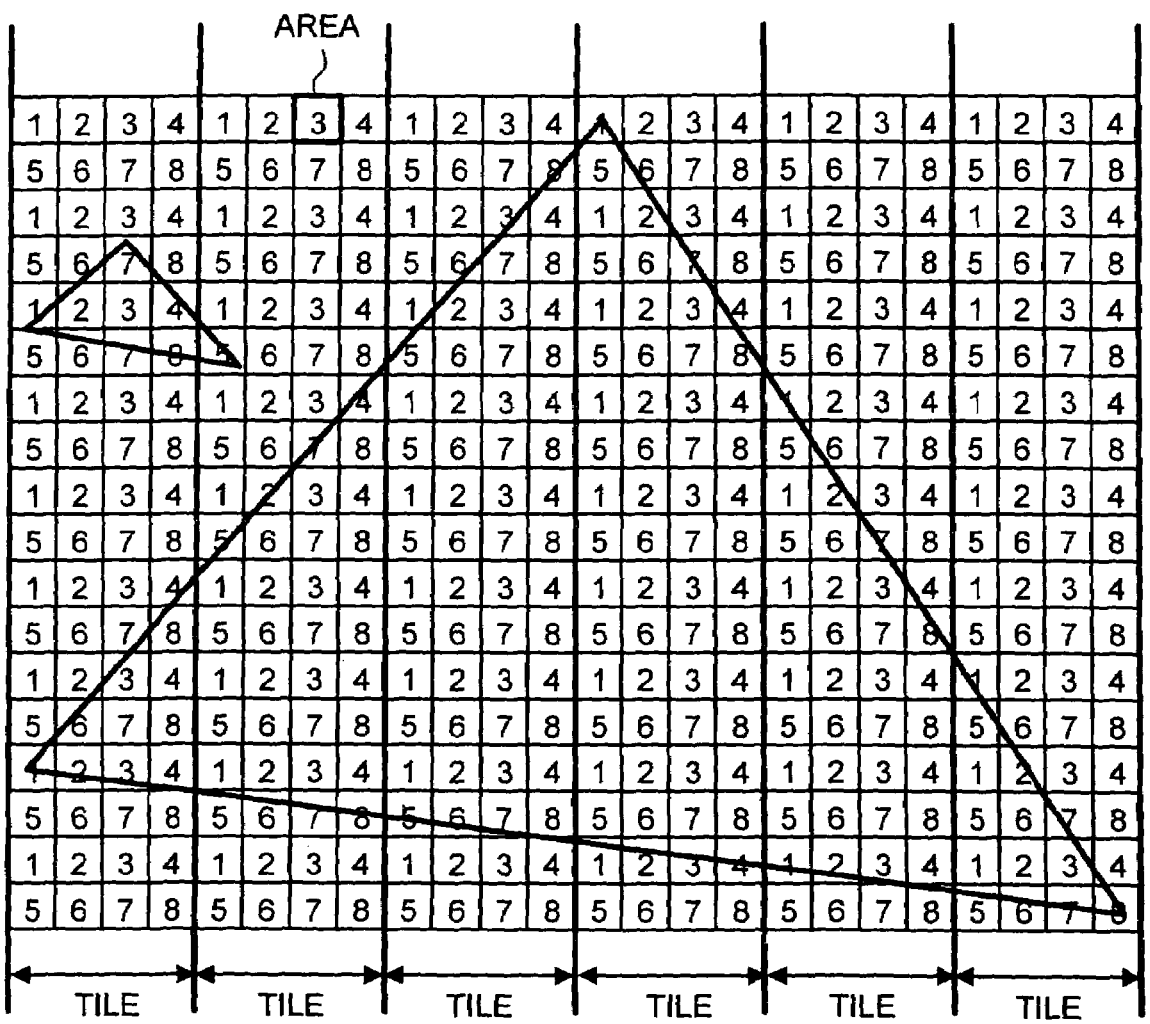
FIG. 50 is an explanatory view for the area rasterization for each tile.

Considering the disadvantage, according to this embodiment, the display is divided into column regions called "tiles" as shown in FIG. 50. After the scan to the areas in one tile is finished, the scan is moved to the areas in the next tile. If the larger triangle show in FIG. 50 is to be scanned, the pixel processors 103 often repeatedly process the areas in an order of the pixel processors 103 numbered 1, 2, 3, 4, 8, 7, 6, and 5 or in an order of pixel processors 103 numbered 4, 3, 2, 1, 5, 6, 7, and 8. The load on the pixel processors 103 can be thereby distributed.

Figure 30:
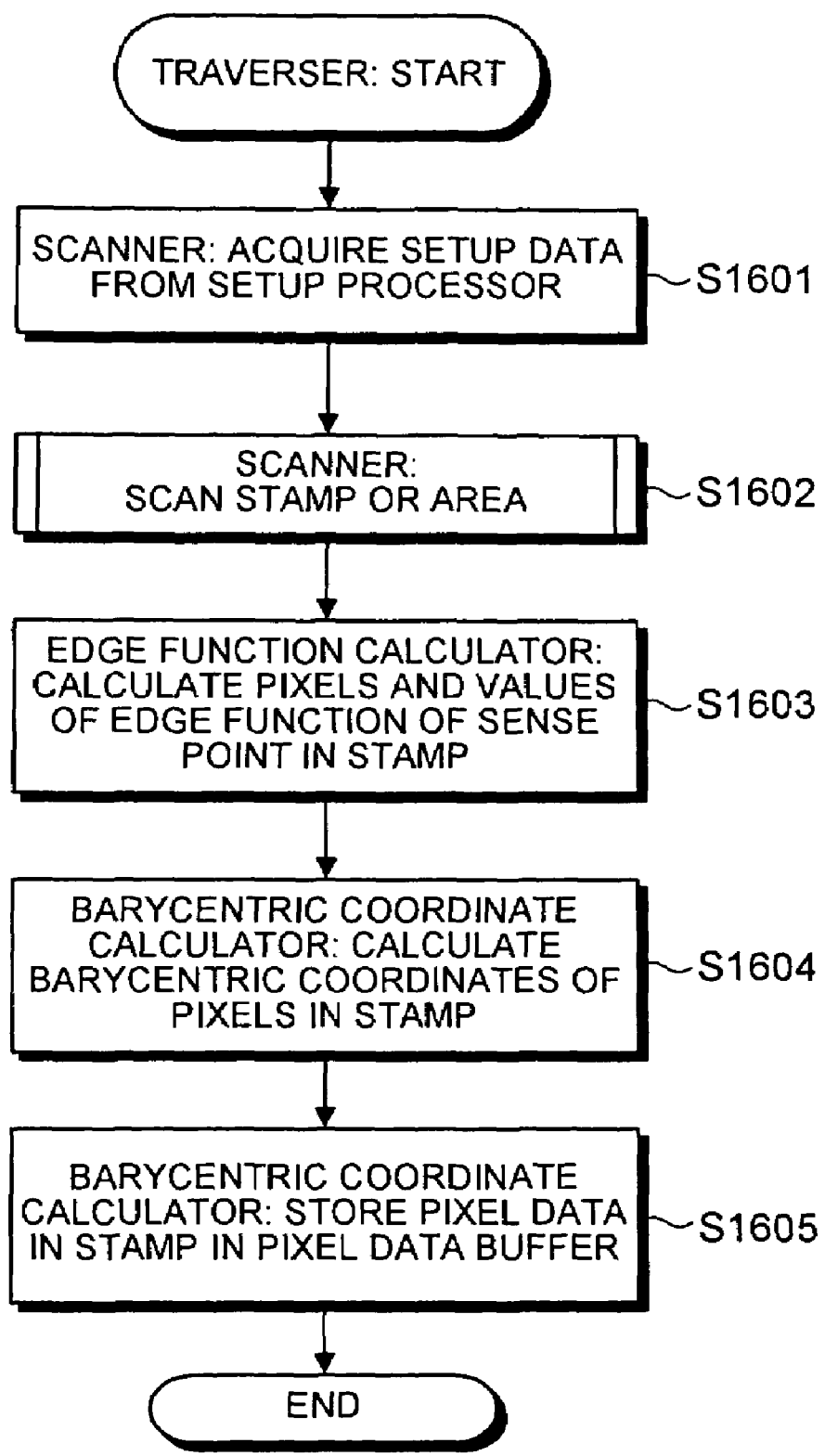
FIG. 30 is a flowchart of the procedures of a traverser.

FIG. 30 is a flowchart of the procedures for a pixel data generation processing performed by the traverser 300. The traverser 300 acquires the setup data from the setup processor 200 (at step S1601). The scan unit 301 scans the stamps or areas (at step S1602). A processing of this scan will be explained later.

If the scan unit 301 moves the scan target stamp or area by one, that is, the processing of one stamp scan or one area scan is finished, the edge function calculator 302 calculates pixels in the stamp and the value of the edge function at the sense point (at step S1603). The barycentric coordinate calculator 303 calculates barycentric coordinates of the pixels in the stamp (at step S1604). The barycentric coordinate calculator 303 stores the pixel data in the stamp in the pixel data buffer 112 (at step S1605). The traverser 300 determines whether the scan unit 301 finishes the scan processing. If the scan unit 301 finishes the scan processing, the processing of the traverser 300 is finished. If scan target pixels remain, the scan processing at step S1602 and the following are repeatedly carried out.

Figure 31:
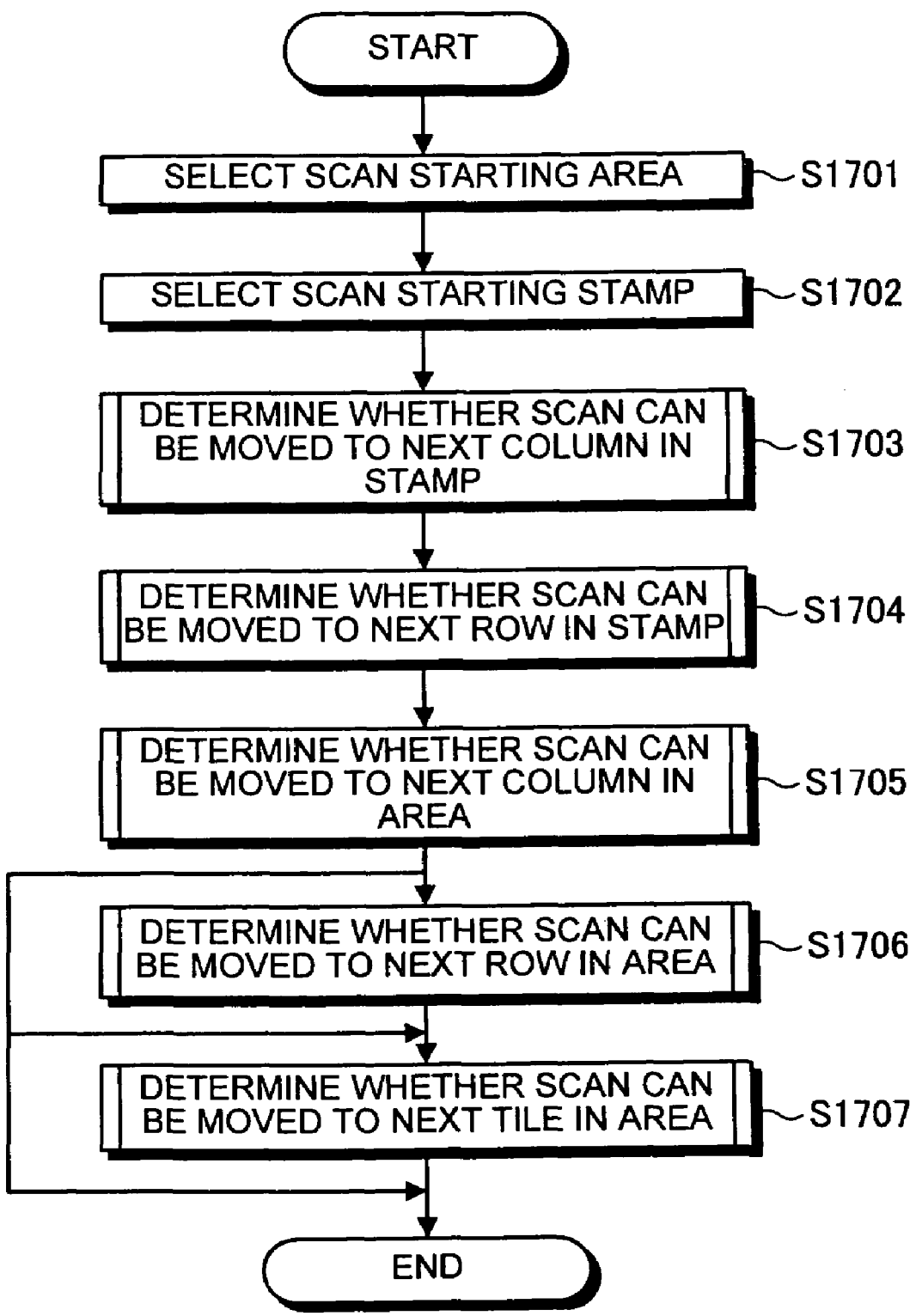
FIG. 31 is a flowchart of the procedures of a pixel scan processor.

The scan processing executed by the scan unit 301 in the traverser 300 at step S1602 will be explained. FIG. 31 is a flowchart of the procedures for the scan processing of the scan unit 301.

The scan unit 301 selects an area including the scan starting point determined by the starting point determiner 301 as a scan starting area (at step S1701). The scan unit 301 selects a stamp including the scan starting point as a scan starting stamp (at step S1702).

The scan unit 301 sequentially executes stamp scan processings including a determination processing as to whether the scan can be moved to a next column in the stamp (at step S1703) and a determination processing as to whether the scan can be moved to a next row in the stamp (at step S1704). The scan unit 301 sequentially executes area scan processings including a determination processing as to whether the scan can be moved to a next column in the area (at step S1705), a determination processing as to whether the scan can be moved to a next row in the area (at step S1706), and a determination processing as to whether the scan can be moved to a next tile in the area (at step S1707).

Figure 32:
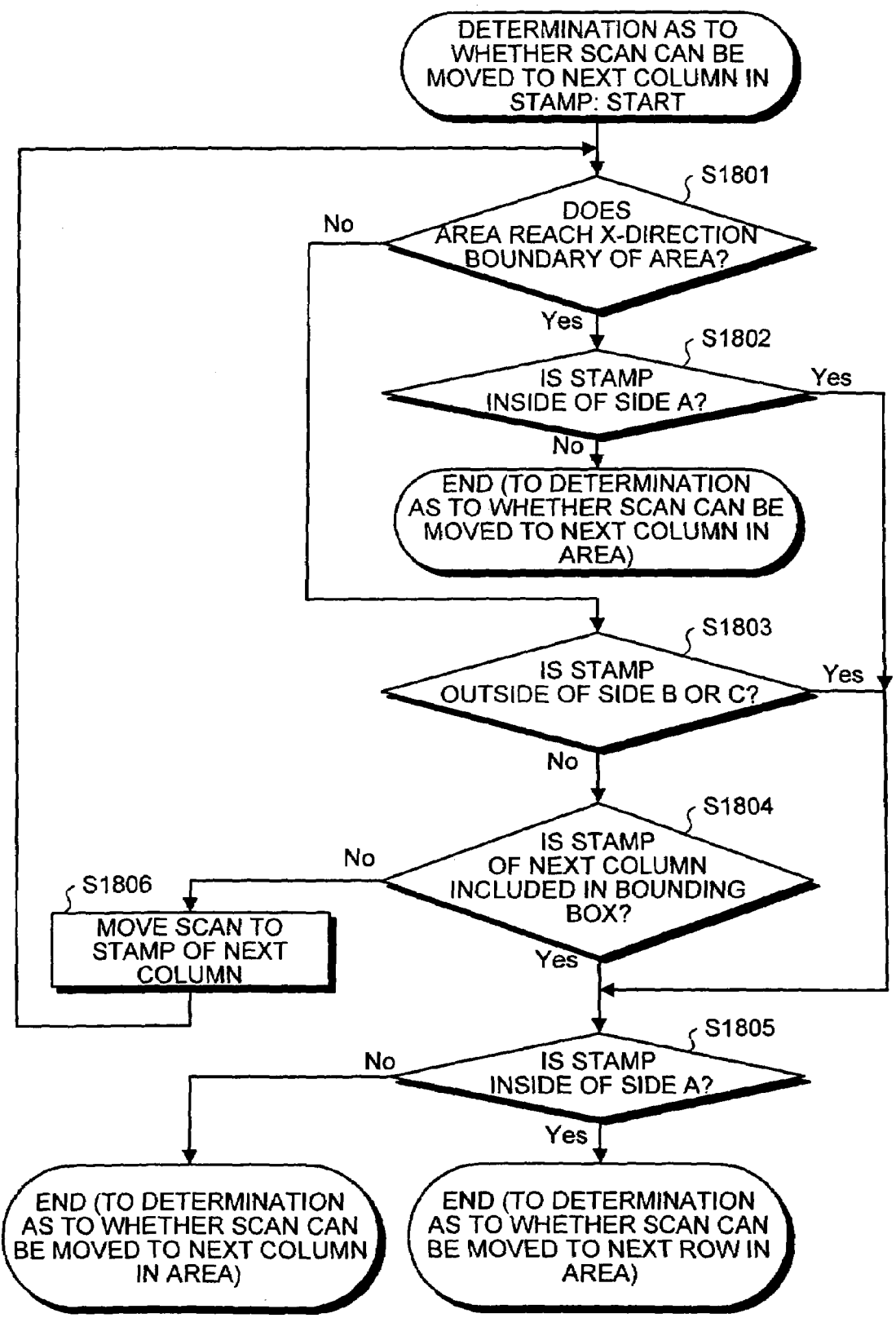
FIG. 32 is a flowchart of the procedures for a determination processing as to whether a scan can be moved to a next column in the stamp.

FIG. 32 is a flowchart of the procedures for the determination processing as to whether the scan can be moved to the next column in the stamp at step S1703.

The scan unit 301 determines whether the stamp reaches a boundary with the area of the next column (at step S1801). If the stamp reaches the boundary, the scan unit 301 goes to step S1802. If the stamp does not reach the boundary, the scan unit 301 goes to step S1803.

Figure 33A:
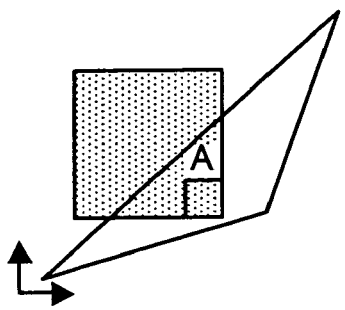
FIGS. 33A to 33E are explanatory views of a content of the determination processing as to whether a scan can be moved to the next column in the stamp.
Figure 33B:
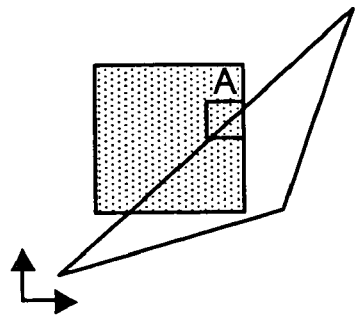

At step S1802, the scan unit 301 determines whether the stamp is inside a side A. The "side A" is a side allocated the point A as the sense point used for the inside and outside determination. To determine whether the stamp is inside the side A, the scan unit 301 determines whether the sense point A is inside the side A. If it is determined at step S1802 that the stamp is inside the side A (FIG. 33A), the scan unit 301 goes to the determination processing as to whether the scan can be moved to the next row in the stamp (step S1704 shown in FIG. 31). If it is determined at step S1802 that the stamp is not inside the side A (FIG. 33B), the scan unit 301 goes to the determination processing as to whether the scan can be moved to the next column in the area (step S1705 shown in FIG. 31).

Figure 33C:
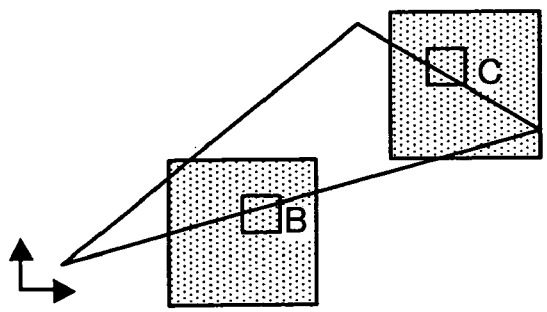

The scan unit 301 determines whether the stamp is outside of a side B or a side C (at step S1803). The "side B and side C" are sides allocated the points B and C as the sense points used for the inside and outside determination, respectively. To determine whether the stamp is outside of the side B or C, the scan unit 301 determines whether the sense point B or C is outside the side B or C. If it is determined that the stamp is outside of the side B or C (FIG. 33C), the scan unit 301 goes to the determination processing as to whether the scan is moved to the next row in the stamp (step S1704 shown in FIG. 31).

If the stamp is not outside of the side B or C, the scan unit 301 determines whether the stamp of the next column is included in the bounding box (at step S1804). If the stamp is not included, the scan unit 301 goes to step S1805. If the stamp is included, then the scan unit 301 moves the scan to the stamp of the next column, and repeatedly carries out the processings from step S1801.

Figure 33D:
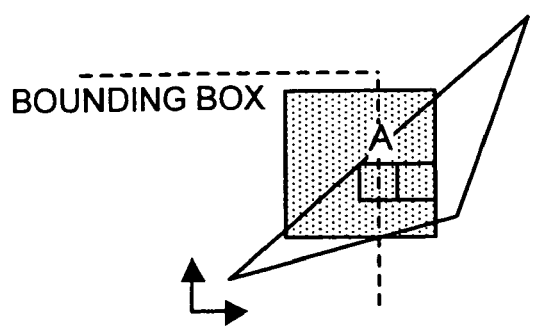
Figure 33E:
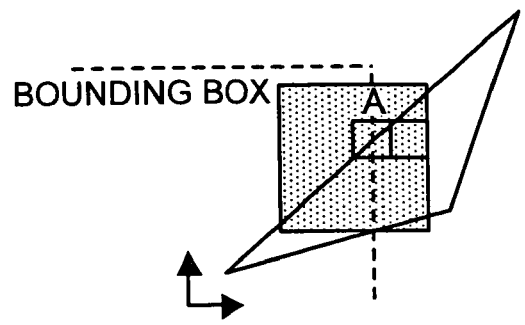

At step S1805, the scan unit 301 determines whether the stamp is inside the side A. If the stamp is inside the side A (FIG. 33D), the scan unit 301 goes to the determination processing as to whether the scan is moved to the next row in the stamp (step S1704 shown in FIG. 31). If the stamp is not inside the side A (FIG. 33E), the scan unit 301 goes to the determination processing as to whether the scan can be moved to the next column in the area (step S1705 shown in FIG. 31).

Figure 34:
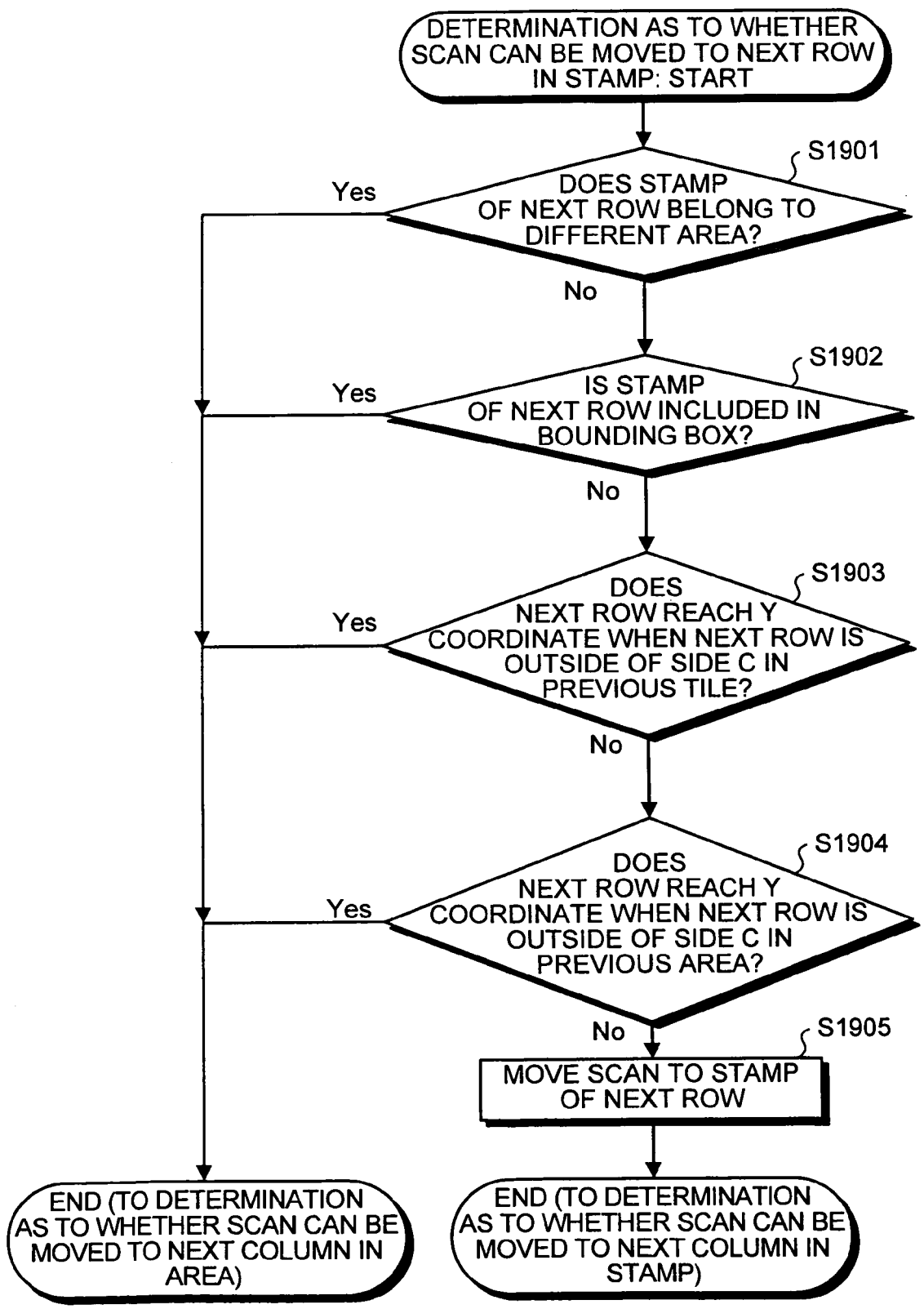
FIG. 34 is a flowchart of the procedures for a determination processing as to whether a scan can be moved to a next column in the stamp.

FIG. 34 is a flowchart of the procedures for the determination processing as to whether the scan can be moved to the stamp of the next row at step S1704.

Figure 35A:
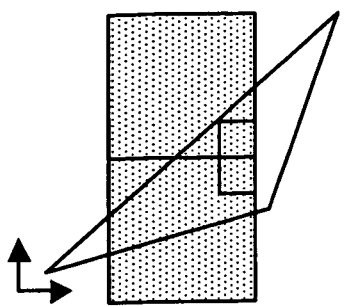
FIGS. 35A to 35D are explanatory views of a content of the determination processing as to whether a scan can be moved to the next column in the stamp.

The scan unit 301 determines whether the stamp of the next row belongs to the different area (at step 1901). If the stamp of the next row belongs to the different area (FIG. 35A), the scan unit 301 goes to the determination processing as to whether the scan can be moved to the next column in the area (step S1705 shown in FIG. 31).

If the stamp of the next row belongs to the same area, the scan unit 301 determines whether the stamp of the next row is included in the bounding box (at step S1902).

Figure 35B:
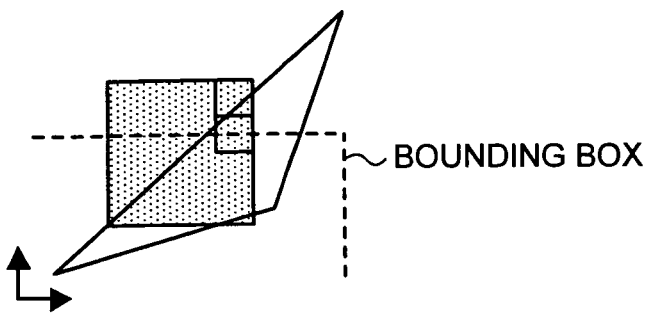

If the stamp of the next row is not included in the bounding box (FIG. 35B), the processing goes to the determination processing as to whether the scan can be moved to the next column in the area (step S1705 shown in FIG. 31).

Figure 35C:
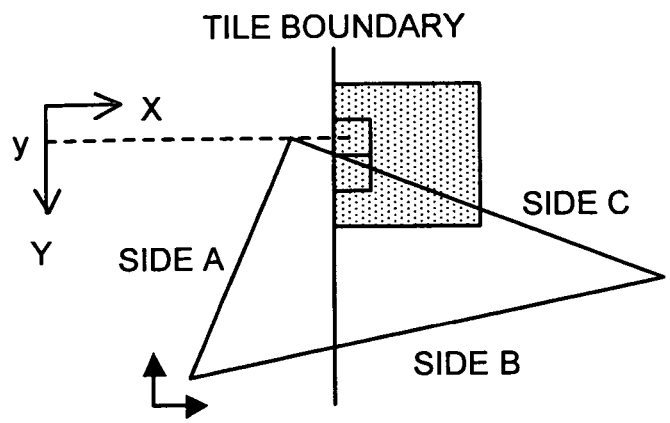

If the stamp of the next row is included in the bounding box, the scan unit 301 determines whether the stamp of the next row reaches the Y coordinate when the stamp is outside of the side C in a previous tile (at step S1903). If the stamp reaches the Y coordinate (FIG. 35C), the scan unit 301 goes to the determination processing as to whether the scan can be moved to the next column in the area (step S1705 shown in FIG. 31).

Figure 35D:
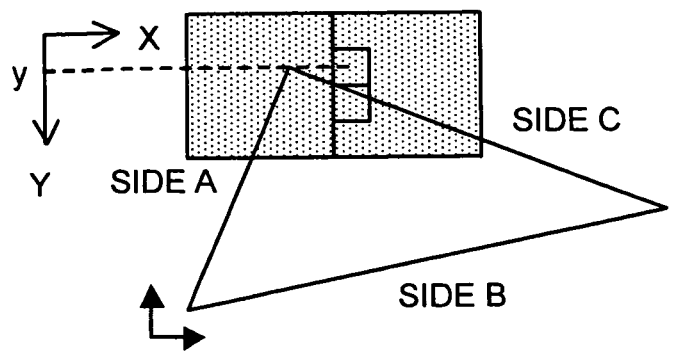

If the stamp does not reach the Y coordinate, the scan unit 301 determined whether the stamp of the next row reaches the Y coordinate when the stamp is outside of the side C in the previous area (at step S1904). If the stamp reaches the Y coordinate (FIG. 35D), the scan unit 301 moves the scan to the next column in the area (step S1705 shown in FIG. 31). If the stamp does not reach the Y coordinate, the scan unit 301 moves the scan to the next stamp (at step S1905), and goes to the determination processing as to whether the scan can be moved to the next column in the stamp (step S1703 shown in FIG. 31).

Figure 36:
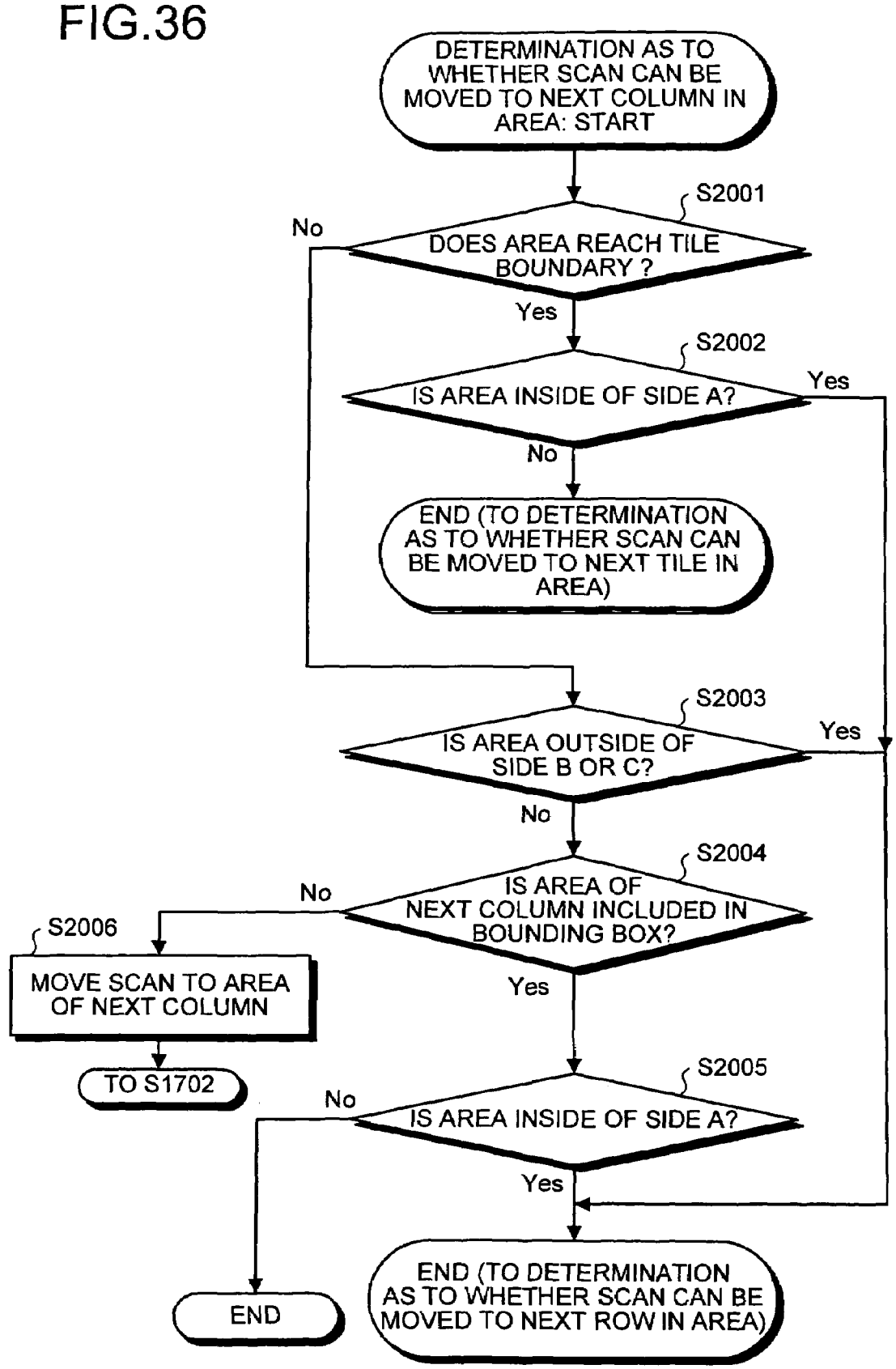
FIG. 36 is a flowchart of the procedures for a determination processing as to whether the scan can be moved to the next column in the area.

FIG. 36 is a flowchart of the procedures for the determination processing as to whether the scan can be moved to the next column in the area. The scan unit 301 determines whether the area reaches a boundary with a next tile (at step S2001). If the area reaches the boundary, the scan unit 301 goes to step S2002. If the area does not reach the boundary, the scan unit 301 goes to step S2003.

Figure 37A:
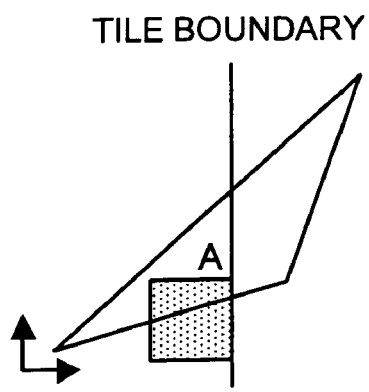
FIGS. 37A to 37E are explanatory views of a content of the determination processing as to whether the scan can be moved to the next column in the area.
Figure 37B:
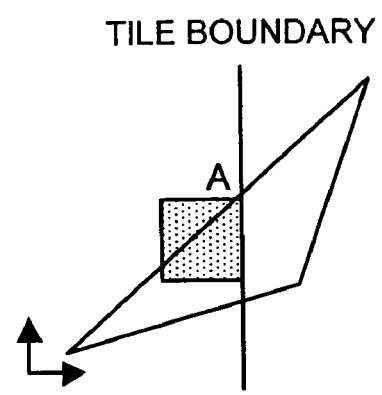

At step S2002, the scan unit 301 determines whether the area is inside of the side A. If the area is inside of the side A (FIG. 37A), the scan unit 301 goes to the determination processing as to whether the scan can be moved to the next row in the area (step S1706 shown in FIG. 31). If the area is outside of the side A (FIG. 37B), the scan unit 301 goes to the determination processing as to whether the scan can be moved to the next tile in the area (step S1707 shown in FIG. 31).

Figure 37C:
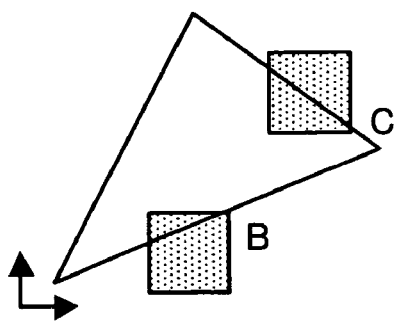

At step S2003, the scan unit 301 determines whether the area is outside of the side B or the side C. If the area is outside of the side B or the side C (FIG. 37C), the scan unit 301 goes to the determination processing as to whether the scan can be moved to the next row in the area (step S1706 shown in FIG. 31). If the area is inside of the side B or the side C, the scan unit 301 goes to step S2004.

At step S2004, the scan unit 301 determines whether the area of the next column is included in the bounding box. If the area of the next column is not included in the bounding box, the scan unit 301 goes to step S2005. If the area of the next column is included in the bounding box, then the scan unit 301 moves the scan to the area of the next column (at step S2006), and goes to step S1702 shown in FIG. 31 at which the scan unit 301 selects the scan starting stamp.

Figure 37D:
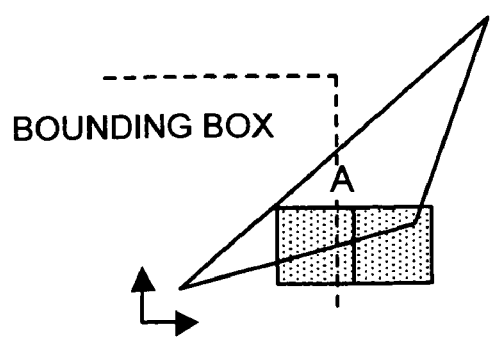
Figure 37E:
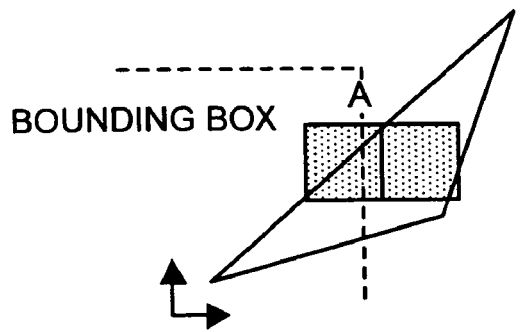

At step S2005, the scan unit 301 determines whether the area is inside of the side A. If the area is inside of the side A (FIG. 37D), the scan unit 301 goes to the determination processing as to whether the scan can be moved to the next row in the area (step S1706 shown in FIG. 31). If the area is outside of the side A (FIG. 37E), the scan unit 301 finishes the processing.

Figure 38:
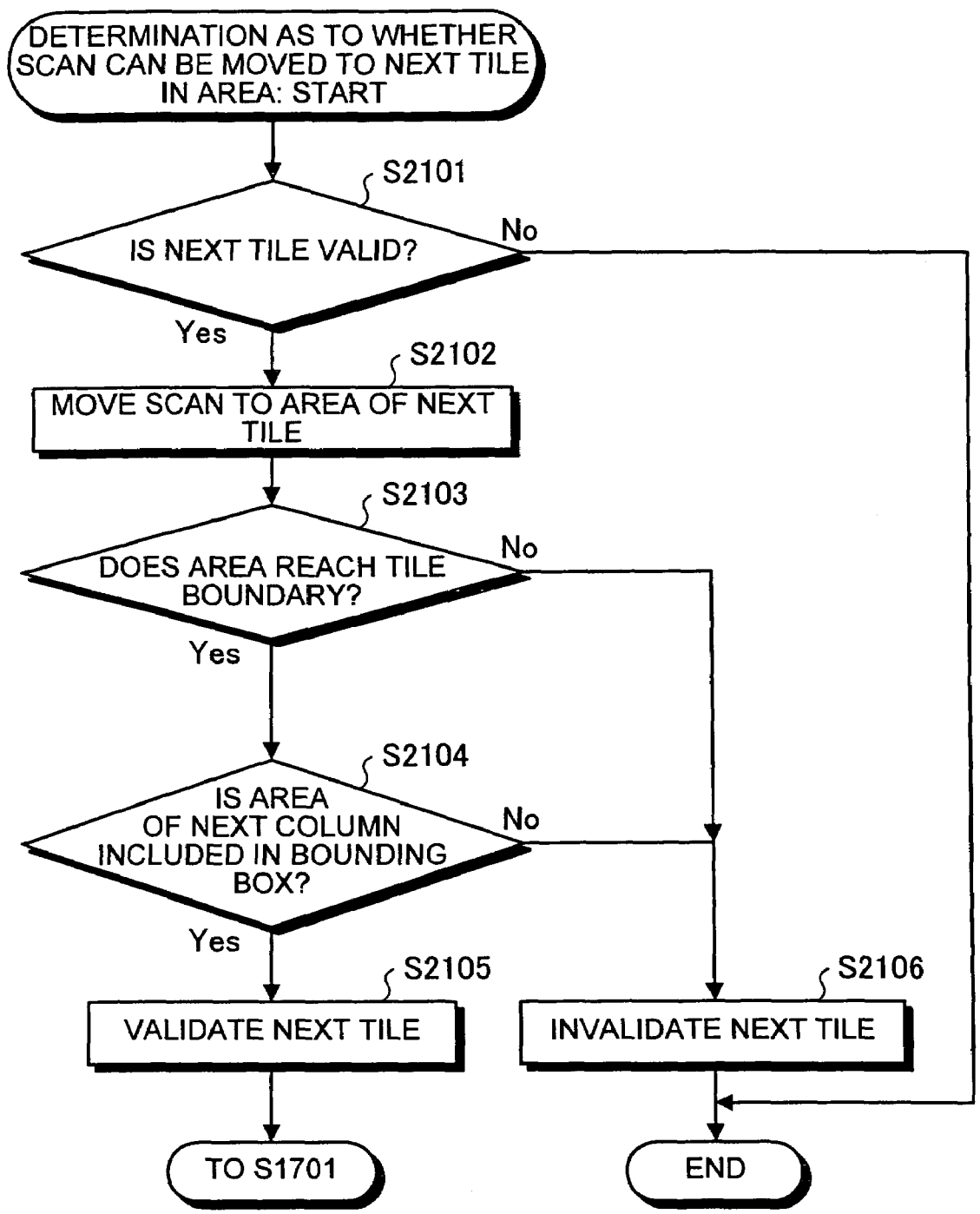
FIG. 38 is a flowchart of the procedures for a determination processing as to whether the scan can be moved to a next tile in the area.

FIG. 38 is a flowchart of the procedures for the determination processing as to whether the scan can be moved to the next tile in the area at step S1707. The scan unit 301 determines whether the next tile is valid (at step S2101). If the next tile is valid, the scan unit 301 moves the scan to the new tile (at stop S2102). If the next tile is not valid, the scan unit 301 finishes the processing.

The determination processing as to whether the next tile is valid at step S2101 is carried out using a flag representing whether the next tile is valid. This flag is updated when the scan unit 301 moves the scan target area (at step S2102). Namely, the scan unit 301 determines whether the area reaches a boundary with the next tile (at step S2103). If the area reaches the boundary, the scan unit 301 goes to step S2104. If the area does not reach the boundary, then the scan unit 301 turns off the flag representing whether the next tile is valid, and invalidates the next tile (at step S2106).

Figure 39:
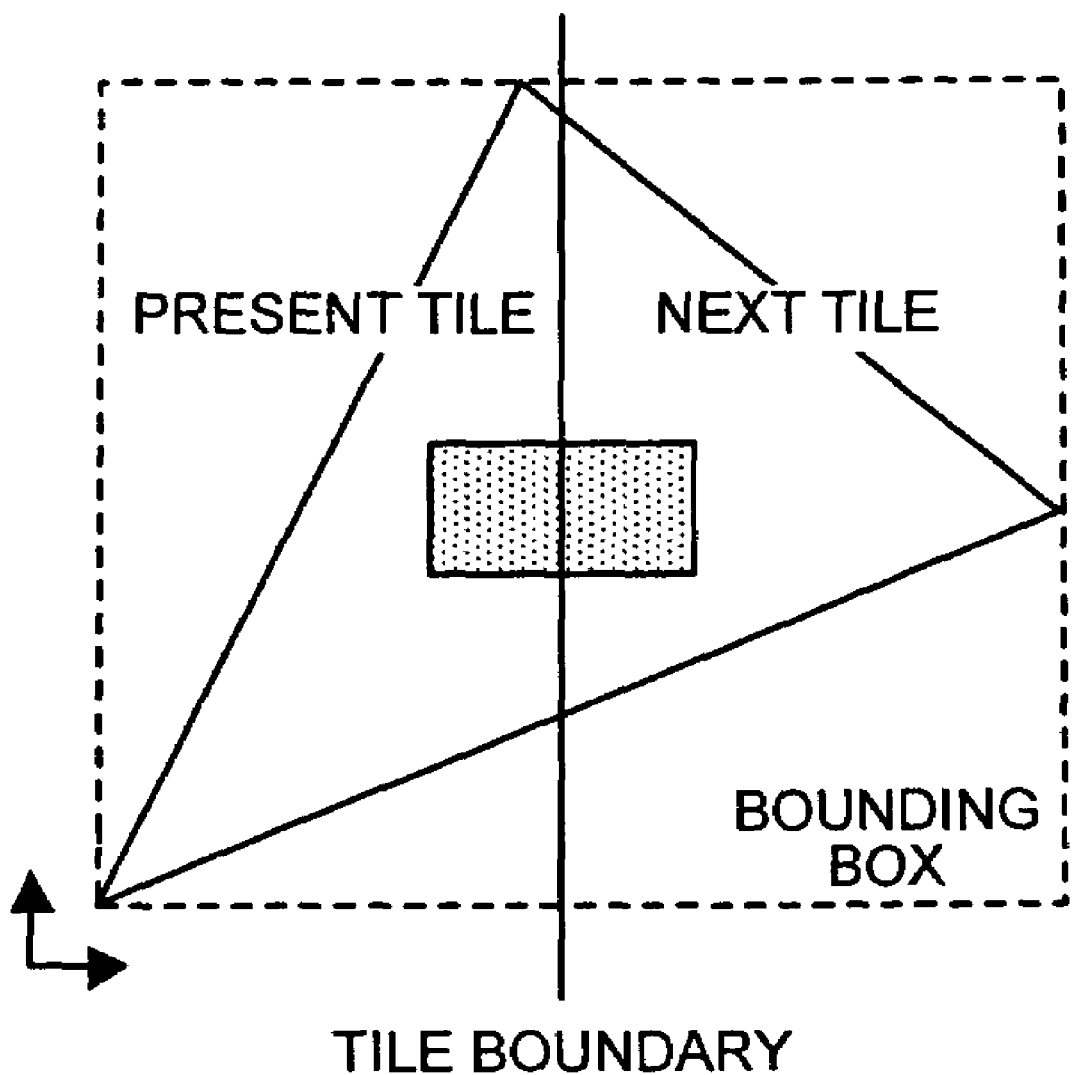
FIG. 39 is an explanatory view of a content of the determination processing as to whether the scan can be moved to the next tile in the area.

At step S2104, the scan unit 301 determines whether the area of the next column is included in the bounding box. If the area of the next column is included in the bounding box (FIG. 39), the scan unit 301 turns on the flag representing whether the next tile is valid (at step S2105). If the area of the next column is not included in the bounding box, the scan unit 301 invalidates the next tile (at step S2106).

Figure 40:
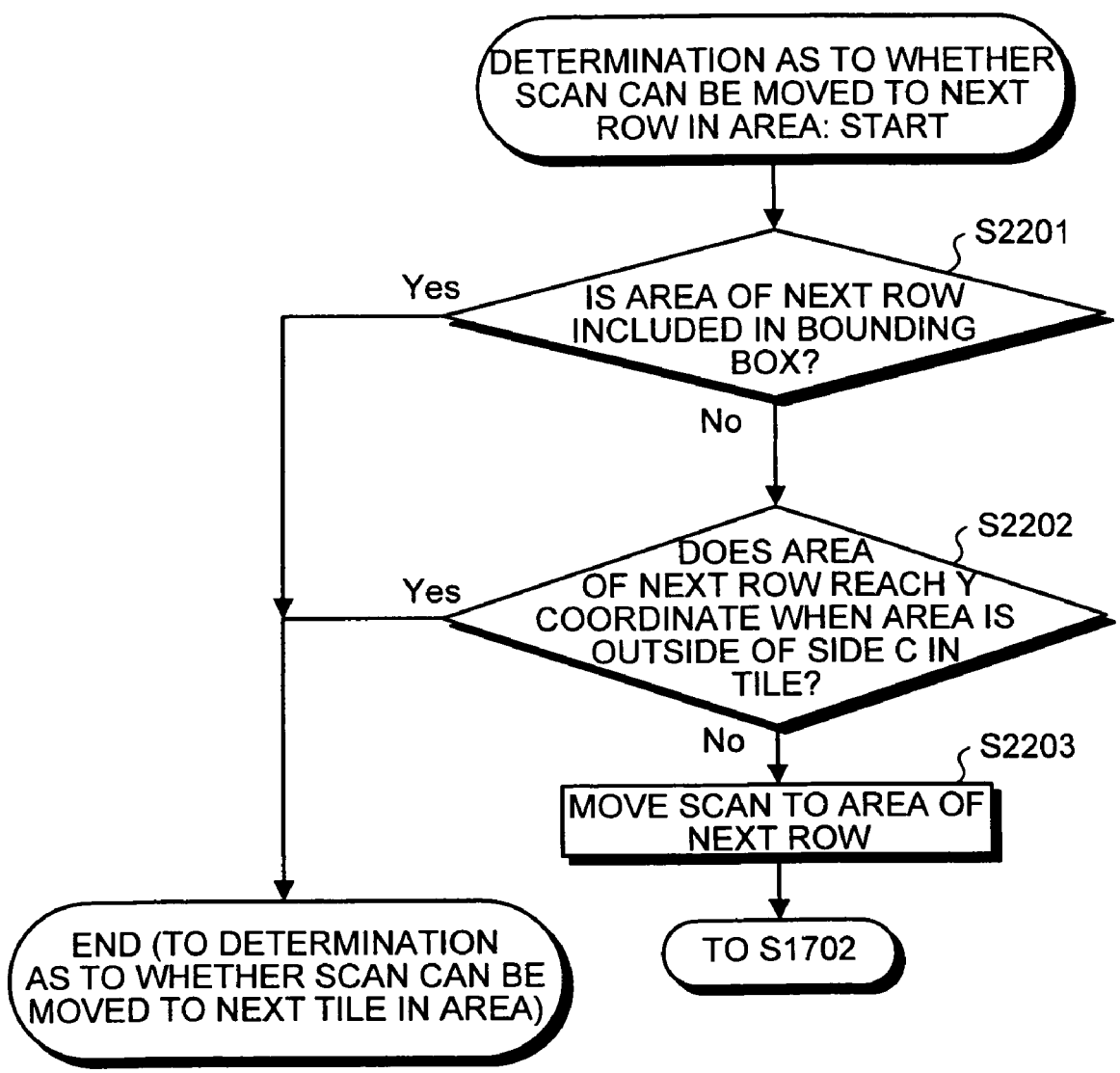
FIG. 40 is a flowchart of the procedures for a determination processing as to whether the scan can be moved to a next raw in the area.
Figure 41A:
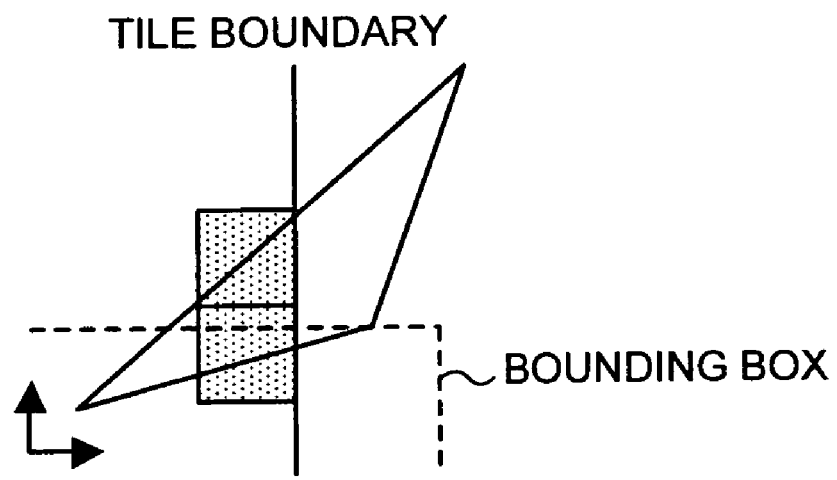
FIGS. 41A and 41B are explanatory views of a content of the determination processing as to whether the scan can be moved to the next row in the area.

FIG. 40 is a flowchart of the procedures for the determination processing as to whether the scan can be moved to the next row in the area at step S1706 shown in FIG. 31. The scan unit 301 determines whether the area of the next row is included in the bounding box (at step S2201). If the area of the next row is not included in the bounding box (FIG. 41A), the scan unit 301 goes to the determination processing as to whether the scan can be moved to the next tile in the area (step S1707 shown in FIG. 31).

Figure 41B:
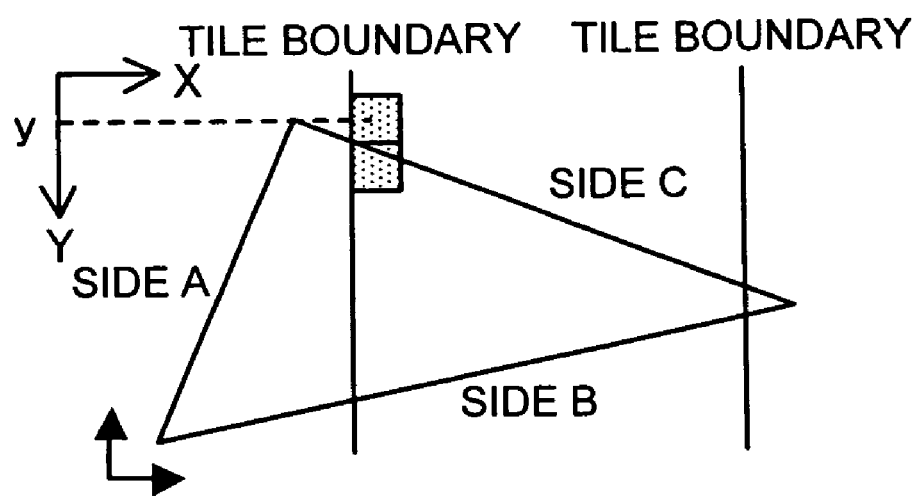

If it is determined at step S2201 that the area of the next row is included in the bounding box, then the scan unit 301 determines whether the area of the next row reaches the Y coordinate when the area is outside of the side C in the previous tile (at step S2202). If the area reaches the Y coordinate (FIG. 41B), the scan unit 301 goes to the determination processing as to whether the scan can be moved to the next tile in the area (step S1707 shown in FIG. 31). If the area does not reach the Y coordinate, then the scan unit 301 moves the scan to the area of the next row (at step S2203), and selects the scan starting stamp at step S1702 shown in FIG. 31.

Figure 42A:
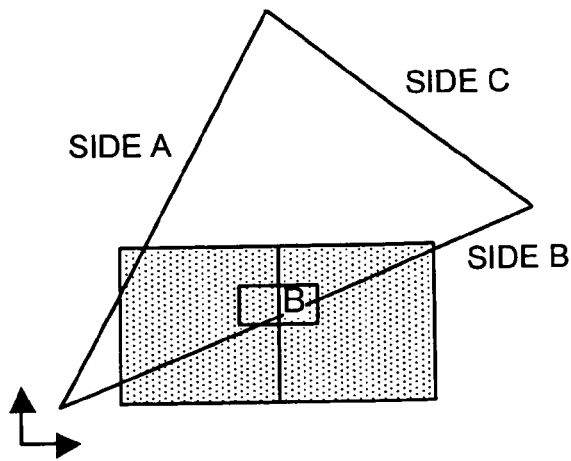
FIGS. 42A and 42B depict a scan starting stamp in an area of the next column.
Figure 42B:
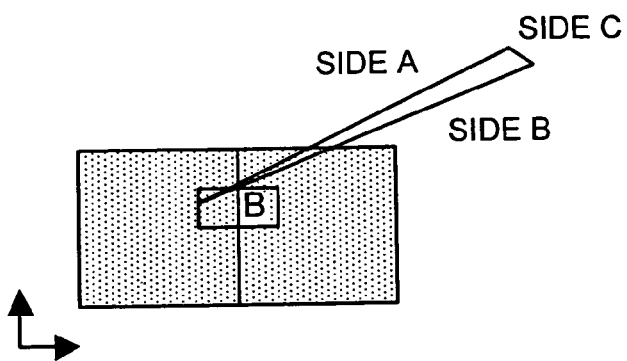

If the scan is moved to the area of the next column, the scan unit 301 needs to carry out the processing for selecting the scan starting stamp. The scan unit 301 finds this scan starting stamp in advance while moving the stamp in the previous area as shown in FIGS. 42A and 42B. Namely, as shown in FIG. 42A, if the stamp reaches the boundary with the area or the next column and the stamp reaches the inside of the side B first among the stamps in the area, the scan unit 301 selects the stamp of the next column as the scan starting stamp in the area of the next column.

It is noted, however, that the scan is often moved to the area of the next column even while the conditions are not satisfied. In FIG. 42B, for example, the scan is moved to the area of the next column while the stamp never enters the inside of the side B. If so, the stamp of the next column when the stamp last reaches the area of the next column may be selected as the scan starting stamp in the area of the next column.

Figure 43:
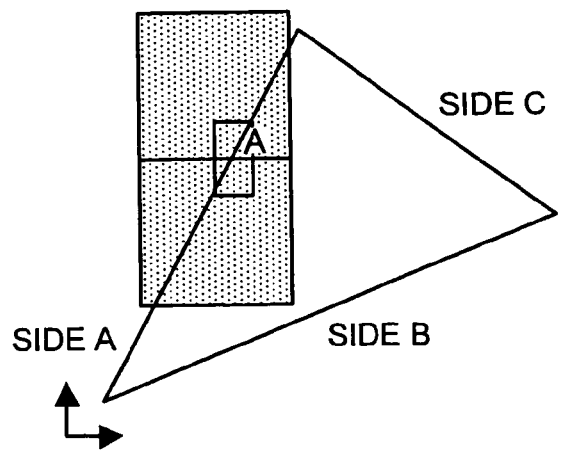
FIG. 43 depicts the scan starting stamp in the area of the next row.

Likewise, if the scan is moved to the area of the next row, the scan unit 301 needs to select the scan starting stamp. The scan unit 301 finds this scan starting stamp in advance while moving the stamp in the previous area as shown in FIG. 43. Namely, as shown in FIG. 43, if the stamp reaches the boundary with the area of the next row and the stamp reaches the inside of the side A first among the stamps in the area, the scan unit 301 selects the stamp of the next column as the scan starting stamp in the area of the next column.

Figure 44A:
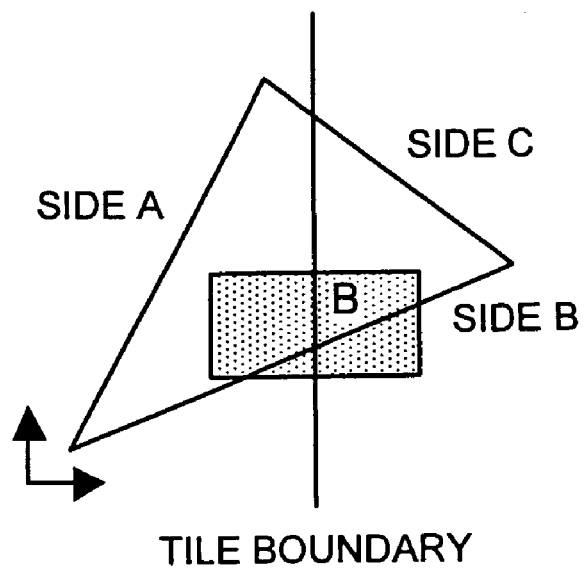
FIGS. 44A and 44B depict a scan starting area in the next tile.
Figure 44B:
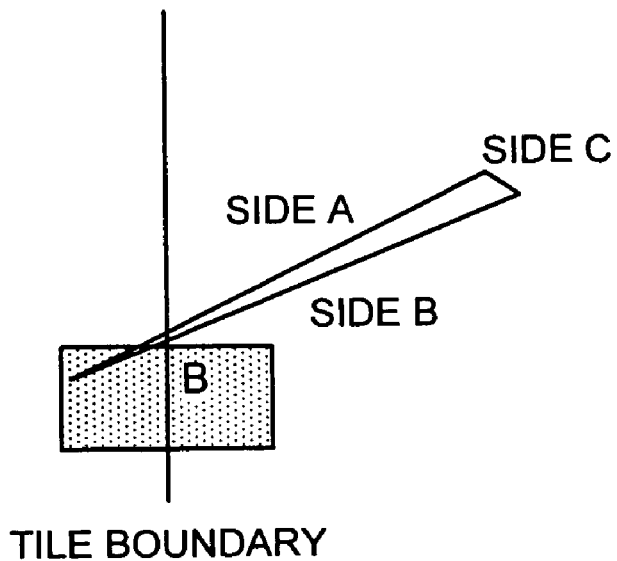

If the scan is moved to the area of the next tile, the scan unit 301 needs to select the scan starting area (step S1701 shown in FIG. 31). The scan unit 301 finds this scan starting area in advance while moving the area of the previous tile as shown in FIGS. 44A and 44B. Namely, as shown in FIG. 44A, if the area reaches the boundary with the next tile and the area reaches the inside of the side B first, the scan unit 301 selects the area of the next column as the scan starting area in the next tile.

It is noted, however, that the scan is often moved to the next tile even while the conditions are not satisfied. In FIG. 44B, for example, the scan is moved to the next tile while the area never enters the inside of the side B. If so, the area of the next column when the area last reaches the boundary with the next tile may be selected as the scan starting area of the next tile.

Figure 45A:
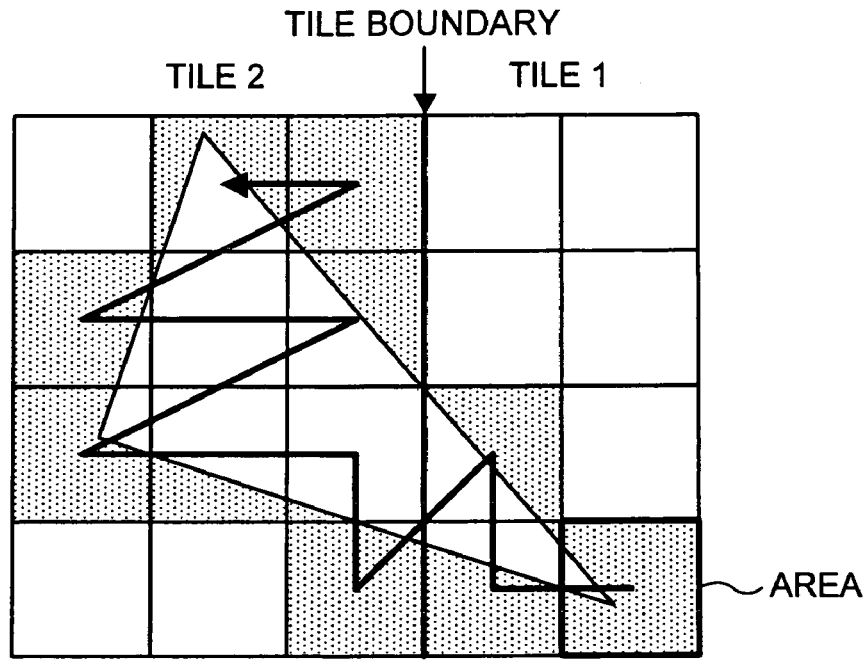
FIG. 45A depicts one example of a pixel scan result.
Figure 45B:
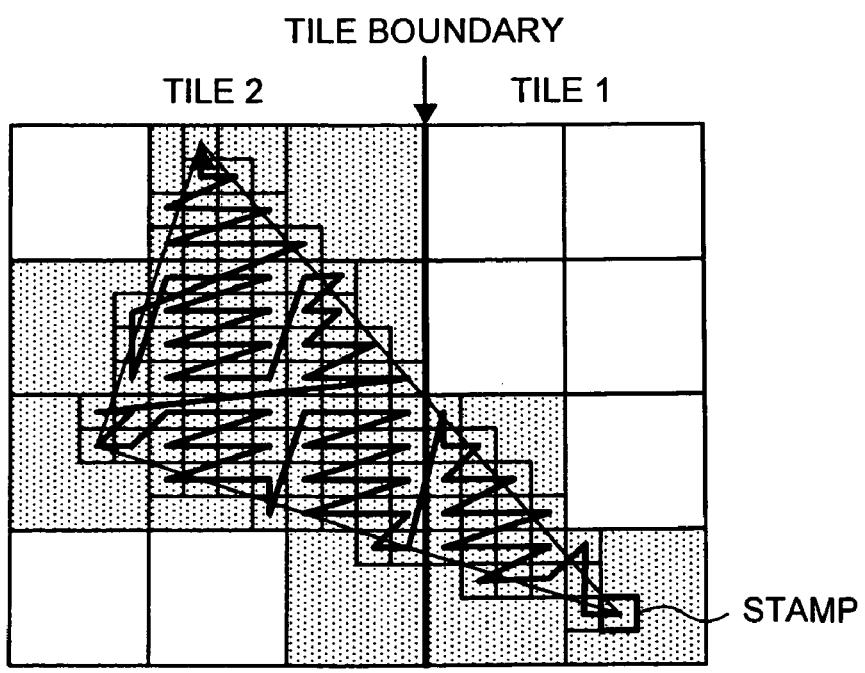
FIG. 45B depicts another example or the pixel scan result.

FIGS. 45A and 45B depict examples of scan results of the scan unit 301 explained so far. In FIG. 45A, an order of the area scan is indicated by an arrow. In FIG. 45B, an order of the stamp scan in the area is indicated by an arrow.

After the scan unit 301 thus carries out the scan processing, the side function calculator 302 calculates the values of the edge functions for the pixels and the sense points in each stamp. The barycentric coordinate calculator 303 calculates the barycentric coordinates of the pixels in each stamp, and the pixel data in the stamp is stored in the pixel data buffer 112.

FIG. 46 is a data structure diagram of an example of the pixel data. As shown in FIG. 46, the pixel data is organized by the window coordinates, the barycentric coordinates, vertex indices, and a coverage.

The traverser 300 according to this embodiment can generate the pixel data through the uniform processings, whether or not a part of the input triangle is behind the point of view.

The present invention calculates edge coefficients of edge functions used to determine whether a pixel is present in the inside region of the triangle based on the vertex data, calculates the bounding box of projected images of the triangle on the projection plane based on the calculated edge coefficients, classifies the projected images of the triangle based on a combination of the edge coefficients for respective sides of the triangle, determines the scan starting point from the corner of the bounding box based on the classification, and scans the bounding box and generates the pixel data from the determined scan starting point, thereby classifying the projected images of the triangle based on a combination of the gradients (coefficients) of the edge functions instead of comparing the magnitudes of the window coordinates of the respective vertices. Therefore, the present invention exhibits the following advantage. Even if a part of the input triangle is behind the point of view, it is possible to generate the setup data by the uniform processing without the need of a special processing similarly to an instance in which all the regions of the triangle are projected onto the projection plane.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus of drawing graphics, comprising:
    an edge coefficient calculator calculating, from vertex data on vertices of a triangle, edge coefficients of edge functions used to determine whether a pixel is present in an inside region of the triangle;
    a bounding box calculator calculating a bounding box of projected images of the triangle on a projection plane based on the edge coefficients;
    a starting point determiner classifying the projected images of the triangle based on a combination of the edge coefficients for respective sides of the triangle, and determining a scan starting point from a corner of the bounding box based on classification of the projected images; and
    a traverser generating pixel data used in rasterization by scanning the bounding box from the scan starting point,
    wherein the starting point determiner classifies the projected images of the triangle based on (1) a combination of a sign of one of the edge coefficients in an X-axis direction and a sign of one of the edge coefficients in a Y-axis direction on the projection plane for each side, (2) based on a classification bit table that presets bits indicating classification of the edge coefficients, and (3) a sum of the bits, and determines the scan starting point based on the classification bit table and the sum.

2. The apparatus according to claim 1, wherein the bounding box calculator calculates the bounding box of the projected images of the triangle on the projection plane from (1) the edge coefficients of two edges connected to the respective vertices and (2) homogeneous coordinates of the vertices.

3. The apparatus according to claim 1, wherein the starting point determiner further determines the scan starting point from the end point of an inside region of the triangle in the bounding box.

4. The apparatus according to claim 1, further comprising:
a sense point determiner determining a sense point for an inside and outside determination of each side of the triangle based on a relationship between a scan direction and the edge coefficients in the bounding box, wherein
the traverser generates the pixel data by scanning the bounding box from the scan starting point while determining whether the pixel is present in the inside region of the triangle based on the sense point.

5. The apparatus according to claim 1, wherein the traverser sequentially moves a stamp including the scan starting point to an adjacent stamp, and generates the pixel data by scanning each stamp.

6. The apparatus according to claim 1, wherein the traverser sequentially moves an area including the scan starting point to an adjacent area, and generates the pixel data by scanning each area.

7. The apparatus according to claim 1, wherein the traverser generates the pixel data by sequentially scanning areas included in a tile obtained by dividing the projection plane in a column direction, and by sequentially scanning stamps included in each area.

8. A method for drawing graphics, comprising:
calculating, from vertex data on vertices of a triangle, edge coefficients of edge functions used to determine whether a pixel is present in an inside region of the triangle;
calculating a bounding box of projected images of the triangle on a projection plane based on the edge coefficients;
classifying the projected images of the triangle based on a combination of the edge coefficients for respective sides of the triangle;
determining a scan starting point from a corner of the bounding box based on classification of the projected images;
generating pixel data used in rasterization by scanning the bounding box from the scan starting point; and
drawing graphic using the generated pixel data on a display,
wherein the classifying classifies the projected images of the triangle based on (1) a combination of a sign of one of the edge coefficients in an X-axis direction and a sign of one of the edge coefficients in a Y-axis direction on the projection plane for each side, (2) based on a classification bit table that presets bits indicating classification of the edge coefficients, and (3) a sum of the bits, and the determining determines the scan starting point based on the classification bit table and the sum.

9. A computer readable medium including computer executable instructions stored therein, wherein the instructions, when executed by a computer, cause a computer to perform:
calculating, from vertex data on vertices of a triangle, edge coefficients of edge functions used to determine whether a pixel is present in an inside region of the triangle;
calculating a bounding box of projected images of the triangle on a projection plane based on the edge coefficients;
classifying the projected images of the triangle based on a combination of the edge coefficients for respective sides of the triangle;
determining a scan starting point from a corner of the bounding box based on classification of the projected images; and
generating pixel data used in rasterization by scanning the bounding box from the scan starting point,
wherein the classifying classifies the projected images of the triangle based on (1) a combination of a sign of one of the edge coefficients in an X-axis direction and a sign of one of the edge coefficients in a Y-axis direction on the projection plane for each side, (2) based on a classification bit table that presets bits indicating classification of the edge coefficients, and (3) a sum of the bits, and the determining determines the scan starting point based on the classification bit table and the sum.

10. An apparatus of drawing graphics, comprising:
edge coefficient calculating means for calculating, from vertex data on vertices of a triangle, edge coefficients of edge functions used to determine whether a pixel is present in an inside region of the triangle;
bounding box calculating means for calculating a bounding box of projected images of the triangle on a projection plane based on the edge coefficients;
starting point determining means for classifying the projected images of the triangle based on a combination of the edge coefficients for respective sides of the triangle, and determining a scan starting point from a corner of the bounding box based on classification of the projected images; and
traversing means for generating pixel data used in rasterization by scanning the bounding box from the scan starting points,
wherein the starting point determining means classifies the projected images of the triangle based on (1) a combination of a sign of one of the edge coefficients in an X-axis direction and a sign of one of the edge coefficients in a Y-axis direction on the projection plane for each side, (2) based on a classification bit table that presets bits indicating classification of the edge coefficients, and (3) a sum of the bits, and determines the scan starting point based on the classification bit table and the sum.

11. The apparatus according to claim 10, wherein the bounding box calculating means calculates the bounding box of the projected images of the triangle on the projection plane from (1) the edge coefficients of two edges connected to the respective vertices and (2) homogeneous coordinates of the vertices.

12. The apparatus according to claim 10, wherein the starting point determining means further determines the scan starting point from the end point of an inside region of the triangle in the bounding box.

13. The apparatus according to claim 10, further comprising:
sense point determining means for determining a sense point for an inside and outside determination of each side of the triangle based on a relationship between a scan direction and the edge coefficients in the bounding box, wherein
the traversing means generates the pixel data by scanning the bounding box from the scan starting point while determining whether the pixel is present in the inside region of the triangle based on the sense point.

14. The apparatus according to claim 10, wherein the traversing means sequentially moves a stamp including the scan starting point to an adjacent stamp, and generates the pixel data by scanning each stamp.

15. The apparatus according to claim 10, wherein the traversing means sequentially moves an area including the scan starting point to an adjacent area, and generates the pixel data by scanning each area.

16. The apparatus according to claim 10, wherein the traversing means generates the pixel data by sequentially scanning areas included in a tile obtained by dividing the projection plane in a column direction, and by sequentially scanning stamps included in each area.

* * * * *